United States Patent
Mitchell et al.

(10) Patent No.: US 12,443,925 B2
(45) Date of Patent: *Oct. 14, 2025

(54) METHODOLOGY FOR BLINDED MESSAGING AS A RECRUITMENT TOOL

(71) Applicant: MYSCHOLAR, LLC, St. Louis, MO (US)

(72) Inventors: Bill Mitchell, St. Louis, MO (US); Blake Ashby, Ferguson, MO (US); Ryan Niemann, Chesterfield, MO (US)

(73) Assignee: MyScholar. LLC, St. Louis, MO (US)

( * ) Notice: Subject to any disclaimer, the term of this patent is extended or adjusted under 35 U.S.C. 154(b) by 121 days.

This patent is subject to a terminal disclaimer.

(21) Appl. No.: 18/093,072

(22) Filed: Jan. 4, 2023

(65) Prior Publication Data
US 2023/0162156 A1    May 25, 2023

Related U.S. Application Data

(63) Continuation-in-part of application No. 17/337,255, filed on Jun. 2, 2021, now Pat. No. 12,294,570.

(60) Provisional application No. 63/033,718, filed on Jun. 2, 2020.

(51) Int. Cl.
| | | |
|---|---|---|
| G06F 15/16 | (2006.01) | |
| G06Q 10/1053 | (2023.01) | |
| G06Q 50/20 | (2012.01) | |

(52) U.S. Cl.
CPC ..... *G06Q 10/1053* (2013.01); *G06Q 50/2053* (2013.01)

(58) Field of Classification Search
CPC . H04L 63/0421; H04L 63/0227; H04L 51/04; H04L 51/10; H04L 51/48; H04L 51/212
See application file for complete search history.

(56) References Cited

U.S. PATENT DOCUMENTS

| | | |
|---|---|---|
| 6,976,172 B2 | 12/2005 | Girard |
| 8,655,311 B2 | 2/2014 | Shaw |
| 8,934,863 B2 | 1/2015 | Shaw |
| 9,430,671 B2 | 8/2016 | Aghasaryan et al. |
| 10,079,807 B2 | 9/2018 | Parikh et al. |
| 10,666,584 B2 | 5/2020 | Shi |
| 10,776,758 B1 | 9/2020 | Benedict et al. |
| 11,102,179 B2 | 8/2021 | Yanai et al. |

(Continued)

*Primary Examiner* — Yves Dalencourt
(74) *Attorney, Agent, or Firm* — Lewis Rice LLC

(57) ABSTRACT

Systems and methods for "blinded" messaging, wherein a user can draft and send targeted communications to groups of other users having specific characteristics selected by the sending user, but the identification of the recipients is not provided to the sender. The system also permits the recipients to respond or engage in interact discussion with the sender, again without revealing any personal or identifying information about the recipient in question. This preserves anonymity and protects privacy. The systems and methods may be implemented in the context of a career or educational opportunity on-line services platform, which matches candidates to opportunities such as schools or jobs. Providers of such positions may also create on the platform career pathway profiles that are linked together to create an emergent, organic web of career paths for students and job-seekers to research and browse.

11 Claims, 12 Drawing Sheets

(56) References Cited

U.S. PATENT DOCUMENTS

| | | |
|---|---|---|
| 11,176,271 B1 | 11/2021 | Garg et al. |
| 2003/0182171 A1 | 9/2003 | Vianello |
| 2004/0148220 A1 | 7/2004 | Freeman, Jr. et al. |
| 2004/0229199 A1 | 11/2004 | Ashley et al. |
| 2005/0233741 A1 | 10/2005 | Zamani et al. |
| 2008/0027993 A1 | 1/2008 | Andino et al. |
| 2013/0080314 A1 | 3/2013 | Powell et al. |
| 2013/0246294 A1 | 9/2013 | Pendyala et al. |
| 2014/0205987 A1 | 7/2014 | Habermehl et al. |
| 2014/0214711 A1 | 7/2014 | Filstein |
| 2015/0039525 A1 | 2/2015 | Frazier et al. |
| 2015/0178682 A1 | 6/2015 | Matthews et al. |
| 2017/0004722 A1 | 1/2017 | Dragos |
| 2017/0109448 A1 | 4/2017 | Adamy et al. |
| 2017/0116576 A1* | 4/2017 | Chernyak ............ H04L 67/306 |
| 2017/0337398 A1 | 11/2017 | Braun |
| 2018/0308062 A1 | 10/2018 | Quitmeyer |
| 2019/0332807 A1 | 10/2019 | Lafever et al. |
| 2020/0302368 A1 | 9/2020 | Mathiesen et al. |

\* cited by examiner

METHODOLOGY FOR BLINDED MESSAGING AS A RECRUITMENT TOOL

CROSS-REFERENCE TO RELATED APPLICATIONS

This application is a Continuation-in-Part (CIP) of U.S. Utility patent application Ser. No. 17/337,255 filed Jun. 2, 2021 which claims the benefit of U.S. Prov. Pat. App. No. 63/033,718, filed Jun. 2, 2020. The entire disclose of all the above documents is herein incorporated by reference.

BACKGROUND OF THE INVENTION

Field of the Invention

The present disclosure relates to the field of communications. In particular, this disclosure relates to systems and methods for providing a blinded messaging system and method, which facilitates one party seeking individuals with particular skills, backgrounds, or other attributes to communicate with those meeting the criteria in a way which both eliminates the searching party learning the identity of the targeted party until it is specifically revealed and does not indicate to the targeted party why the target is being targeted.

Description of the Related Art

The world is increasingly concerned with the privacy of personal and identifying information, particularly in the interconnected digital age where the vast majority of information about people is stored on computer networks. Privacy is a complicated issue with no easy, or even singular, solution. Specifically, most people want to keep at least some of information they have loaded onto computer networks private as they fear how that information will be used against them. At the same time, keeping information private often inhibits those that could supply benefits to someone from ever finding them and providing the benefit. The examples are myriad. A person keeping a question private avoids ridicule or scorn from having the question, but also often keeps them from finding the answer. Keeping performance concerns private avoids them being unfairly used in decision-making, but can keep the person from obtaining meaningful correction for (and thus elimination of) the concern. In an extreme, keeping an issue private can result in personal shame from simply not knowing that the issue is actually common.

In the digital arena, privacy has gone through a shift of what is both available digitally, and what it can be used for. Originally, privacy concerns were primarily from keeping certain information from nefarious actors who could use it for unlawful, or morally concerning, activity. As a simple example, identifying information of an individual could be taken from a computer network by a nefarious party who could them use the information to impersonate the original holder of the information and steal their bank accounts or damage personal relationships. This was of concern because many security systems concerned with accurate identification of individuals relied on "private knowledge" of the individual and therefore having that knowledge implied that the person using it was the expected individual.

The most simple example of this is a password protected access portal to a bank account. The password is a piece of knowledge which is expected to only be held by the owner of the account (who would have set it). Given the vast number of possible passwords that could be used, it was generally expected that a nefarious actor could not simply guess the password from the massive number of possibilities. Thus, digital information was kept private simply because it couldn't be accessed by anyone but its authorized user. Problems arose, however, because human fallibility meant that selected passwords were often chosen from a set of possibilities that were far less than the possible set of what they could be and this set may be able to be found out from other available information. To deal with this human concern, systems began to require passwords of a design intended to increase the set of used passwords more toward the set of possible passwords (which is effectively of such large number as to be infinite in any practical calculation). These more complicated passwords, however, often resulted in a need to store them (often digitally) and that storage can then be accessed to obtain them.

While the password is a simplified example, the concept of unique identification of an individual, and the attachment of many of the necessities of modern life to that identity, is an issue of major lingering concern. The concept of "identity theft" where a nefarious party can obtain enough information of a user to accurately impersonate them in a variety of environments (particularly digital environments) is still a massive worldwide problem. At the same time that there exists a need to identify a user accurately for security and unique access by them to their digital information, there is also a desire to target users based on aspects of their identity. In effect, the more that is known about a user (the more they are identified as a unique individual), the easier it is to make sure that messages targeted for them are received by them and for them to find information that they want.

Basically, anyone who is looking for candidates that meet a certain criteria typically has a reason for looking for candidates with those criteria that relates to opportunities that may interest those candidates. This can be both a positive and a negative. As a positive, those candidates that are truly interested in an opportunity of a provider will typically be glad to receive a notification of it. However, many candidates do not want to have items targeted to them because they want information on their preferences to not be known. In effect, providers of opportunities typically want complete information about a candidate, but the candidate, while often interested in the opportunity, may not want to provide the information that the provider wants to correctly target them for it.

In recent years, concerns about the ability to determine the identity, or specific aspects of the person's identity, from their digital behavior have risen in concern. Many common digital systems, such as search engines and social networks, can obtain a large amount of information about their users both with, and without, their express knowledge and advanced neural networks or other data engines can find patterns in this data that even the human brain cannot readily comprehend. As many of our most used digital systems require identification of the user using them (for example, social networks where communication is truly anonymous tend to be non-functional), the ability to collect vast amounts of data identified with the user has become a reality simply by a user working within a digital environment at a level to remain functional in society. The transfer of this data for use by others has also become big business, and has resulted in potential concerns about privacy which have nothing to do with keeping information behind a password.

This push-pull of identification requires difficult balance and also is often hard to understand and control as a user. Basically every user appreciates being notified of an opportunity they want to find out about, but also worries about why they are given the opportunity and what it may say about them. Further, the ability to associate data about a user with the user, even without their knowledge, has many concerned that private information will no longer exist. While there is some argument that eliminating the ability to keep anything private (e.g. to ever lie) may be beneficial to society, there are also, often more powerful arguments, that the ability to keep some information private (to lie) is actually necessary to the smooth functioning of human society.

Governments have responded to recent concerns over the loss of privacy with legislative efforts focused on protecting and maintaining personal privacy in one's electronic data, such as the General Data Protection Regulation ("GDPR") and the California Consumer Privacy Act ("CCPA"). These and other laws highlight the desire by many to maintain the privacy of personal information and, at least it is hoped, leave the decision of whether and how to reveal the information in the hands of the user (as opposed to others). In the United States, there is not yet a comprehensive federal scheme for general privacy protection, but federal law does include a number of subject-matter specific laws targeted to the privacy of specific types of personal information. Examples include the Family Educational Rights and Privacy Act ("FERPA") and the Health Insurance Portability and Accountability Act ("HIPAA"), which require certain institutions and types of data custodians to protect, respectively, educational student data, and health care information.

While these laws are valuable and important, they do have some undesirable downstream effects because they necessary limit the disclosure of data to the user themselves, which means that those wishing to provide something the user would actually want may be unable to locate the user because the data has not yet been disclosed. For example, the current state of FERPA guidelines protects information about students. With some exceptions, this law generally prohibits educational institutions from disclosing information in children's educational records to third parties other than parents or legal guardians without the student's parent or guardian's prior (usually written) consent. This covers a range of records, ranging from grades to aptitude and interest tests and survey scores to behavior records, such as educational disciplinary actions or even extracurricular group membership.

The good thing about this type of privacy is that it prevents the student from being targeted by a nefarious actor because of the information being disclosed or from the student having private information about them disclosed unintentionally and without their desire to make the information public. At the same time, the laws make it difficult for third parties to identify specific students or groups of students for whom certain educational or career information or materials are most relevant or applicable meaning that such information is often generally and inaccurately targeted. This serves to clutter up the information space as all information is targeted to too many candidates which can keep those who would want it from finding it.

As an example, suppose an international non-profit organization providing vaccinations to emerging economies seeks to expand to a new country and is interested in recruiting students who may be interested in the mission of the organization. However, language proficiency of the language in the target country is an absolute necessity to carry out that mission. The organization cannot simply contact schools and request lists of students interested in health science or international affairs, who speak the language of the target country, because disclosing that information without the student's prior consent is not permitted. Thus, the organization cannot provide information targeted only to students who speak the necessary language and are the only ones that could take this position. Instead that organization can merely advertise their mission and goals broadly to the school and hope that their message reaches the students that have the necessary language proficiency. However, in this case, their advertisement competes for time with every other organization having interest in the students. This makes it hard for a student that would immediately take and enjoy this opportunity to find it, and results in the organization also getting inquiries from students that they could never accept.

The inability to provide a message only to a more receptive audience results in a poor noise-to-bandwidth ratio for any type of general recruitment activity on both sides. Specifically, for any organization which is seeking to locate individuals meeting target criteria, they are typically forced to send general information and wade through inquiries by candidates that don't meet it. Similarly, those looking for particular opportunities often have to wade through large amounts of recruiting information which is not intended for (or of interest to) them specifically. Thus, at typical recruiting events and job fairs for graduating students, even when geared to a particular type of opportunity, students simply wander from booth to booth in crowded auditoriums for hours and become frustrated and discouraged, even while perhaps passing right by an ideal match without realizing it simply because the student didn't see the organization's signage.

This makes the search for students by enterprises unnecessarily difficult and expensive, and it makes the search by students for interesting and enriching educational, work, or volunteer opportunities unnecessarily overwhelming, frustrating, and daunting. This can also result is students making life-changing decisions without access to the best and most relevant information. A student may take a mismatched opportunity out of desperation of not finding a matching one, which can result in low job satisfaction, building the wrong kind of resume, and generally sending the student off on the wrong career path while saddled with oppressive student loan debt. Similarly, an employer may take a mismatched student that does not fit in well with the corporate culture, does not perform as necessary, and is ultimately terminated resulting in the company having to spend more resources to locate a replacement.

Because of problems like the above, one of the major places where both noise reduction and maintenance of anonymity are important is in people making decisions about their future. It is well recognized that certain types of careers and educational opportunities are best suited to students with specific backgrounds and interests. Performance in school is of interest to employers, the military, public agencies, as well as colleges and trade schools. Factors such as grades, classes taken, attendance, and extracurricular activities (e.g., service organizations, athletics, and clubs) can all be indicators of high suitability for certain jobs, projects, majors, or other opportunities. Further, organizations seeking candidates for job, career, or educational opportunities rarely benefit from attracting mismatched students and students that chose the wrong path are often unhappy while also finding it difficult to change paths. Thus, it is important that opportunity providers to students be able to find students that are good fits for them, and that students also be able to find good fit opportunities for themselves as well. However, this need to correctly match comes with a need to reveal information, and the potential lost privacy to carry that out can be concerning to both sides as well.

Therefore, what is needed in the art is a system that facilitates "blinded" messaging between such institutions and students that protects the privacy of student information so that the providers of the opportunities are not able to know too much about their candidates, or identify a specific relevant candidate, until the candidate chooses to reveal the information. The system also should assist students with using their educational experiences and other qualifications to identify promising career and educational opportunities and to utilize available tools on career options, individual aptitude, and their performance on entrance exams and the like to better understand themselves and how to find a future they enjoy.

Such a solution should provide a mechanism for providers (e.g., employers and educational institutions) to reach students whose qualifications (e.g., grades, attendance, interests, career goals, extra-curricular activities) are a good match for the providers' available opportunities and the students to learn about opportunities of providers which are also a good fit for their qualifications. All of this should be done while reducing the total noise (information on mismatched opportunities) being received by either side.

There are already a number of "blinded" messaging systems available where information is provided which is simply de-identified (that is, information specifically identifying the user is removed) so that the receiver of the user's information is unable to connect the received information with any one user. These systems, however, have a number of problems for use as a general recruitment tool. In the first instance, they often have to overly simplify or even misrepresent the specific qualities of a candidate to avoid their identity being determinable. As a simple example, a system may indicate that they are currently leading a large scientifically oriented institution (which would encompass many people) as opposed to indicate that they are currently the head of the United States Patent and Trademark Office (which identifies exactly one person). This need to "obscure" specifics is often because personal information is provided to the person doing the recruiting in a de-identified form because decisions on selection of candidates are often made initially by the recruiter and not by the recruited. For example, in online hiring systems, candidate employees typically put out general indications of the jobs they want or are qualified for. Electronic systems then match these to employer's needs, and the employee's de-identified information is sent to the employer for them to determine who they want to continue with further as a possible candidate.

Instead, blinded messaging ideally needs to go the other way or both ways and this is particularly true with regards to students. Most people feel that the high school student should pick their preferred college, instead of the college picking their preferred student. However, most systems using de-identified data provide information as if the latter arrangement was preferred. It is most effective when the criteria are met and both sides can determine that they are good fits for each other.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a computer-implemented method for implementing a blinded messaging system which for targeted recruitment of an individual from a group by providing the targeted individual a message based on them meeting a set of criteria. The system, however, also obscures from the targeted individual why have been targeted to receive the message and, in many respects, even that the message is targeted. It also obscures from the sender the specifics of them having been targeted (or that they have even been targeted at all). However, if the message resonates with the target, the target has the option to interact with the sender which interaction can result in them revealing information which will indicate why they are targeted while simultaneously the reason for them being targeted will often be revealed to them.

In an embodiment, the system obtains the information not by de-identifying specific information, but instead by simply making an accurately identified connection without revealing much or any information to either side. Each side is therefore able to determine their own interest in the opportunity being pursued with a simple reduction in the overall noise in the communication. This is different from many current systems which try to provide a specific one-to-one match (e.g. to find a specific employee for a specific job) and therefore have to reveal a lot of information about a candidate, even if such information is de-identified or to many-to-many systems where virtually no information is revealed leading to no need to de-identify the information. In an embodiment of the present system, the connection is more of a few-to-few connection where a one-to-one connection is made in the background by a machine without either party knowing that there has been such a connection, and a number of such one-to-one connections are revealed together to provide the few-to-few type of relationship.

There is described herein, among other things, a system providing a blinded messaging service comprising: a server computer communicably coupled to a telecommunications network; a provider computer of at least one provider, said provider computer communicably coupled to said server computer via said telecommunications network; and a plurality of candidate computers, each candidate computer being a computer of a candidate and communicably coupled to said server computer via said telecommunications network; wherein said computer server receives from each candidate, candidate profile data; wherein said computer server receives from said provider computer, a communication comprising candidate selection criteria, said candidate selection criteria comprising information about characteristics desired by said at least one provider for a candidate for an opportunity offered by said provider; wherein said computer server receives from said provider computer, a communication comprising information about said opportunity, said communication being linked to said candidate selection criteria; wherein said computer server compares said received candidate selection criteria to said candidate profile data for each candidate and creates a set of candidates whose candidate profiles match said received candidate selection criteria; and only for each candidate in said set of candidates, said computer server placing said communication as part of a news feed provided to each candidate in said set of candidates.

In an embodiment of the system, the candidate profile data for each candidate in said plurality of candidates comprises educational data about said each candidate.

In an embodiment of the system, the educational data comprises one or more of grades, classes taken, grade point average, attendance history, standardized test scores, and certifications received.

In an embodiment of the system, the opportunity is selected from the group consisting of: a job, admission to an academic institution, and enlistment in military service.

In an embodiment, the system further comprises: receiving, at said provider computer, a message comprising a number of candidates in said set of candidates.

In an embodiment, the system further comprises: determining, at said computer server, whether said number of candidates is at or above a predefined threshold; only if said computer server determines that said number of candidates is at or above said predefined threshold, said computer server transmitting to said provider computer a message comprising said number of candidates; and if said computer server determines that said number of candidates is not at or above said predefined threshold, said computer server does not transmit to said provider computer said message comprising said number of candidates.

In an embodiment, the system further comprises: in response to receiving said copy of said communication comprising information about said opportunity, at least one candidate manipulating a user interface of said candidate computer of said at least one candidate to opt into further communication from said provider.

In an embodiment of the system, the provider is notified that a candidate whose candidate profile matched said received candidate selection criteria opted into receiving further communication, but said candidate whose candidate profile matched said received candidate selection criteria is not identified to said provider.

In an embodiment of the system, the provider may communicate directly with said candidate whose candidate profile matched said received candidate selection criteria.

In an embodiment of the system, the provider may provide communications for posting to said news feed of said candidate whose candidate profile matched said received candidate selection criteria.

In an embodiment of the system, the candidate profile data includes results from a candidate having completed one or more surveys

BRIEF DESCRIPTION OF THE DRAWINGS

FIG. 9 provides an embodiment of a screen shot of a provider page for a provider of military service.

FIG. 15 provides an embodiment of a screen shot showing a candidate their progression on a proposed pathway.

DESCRIPTION OF THE PREFERRED EMBODIMENT(S)

Figure 1:
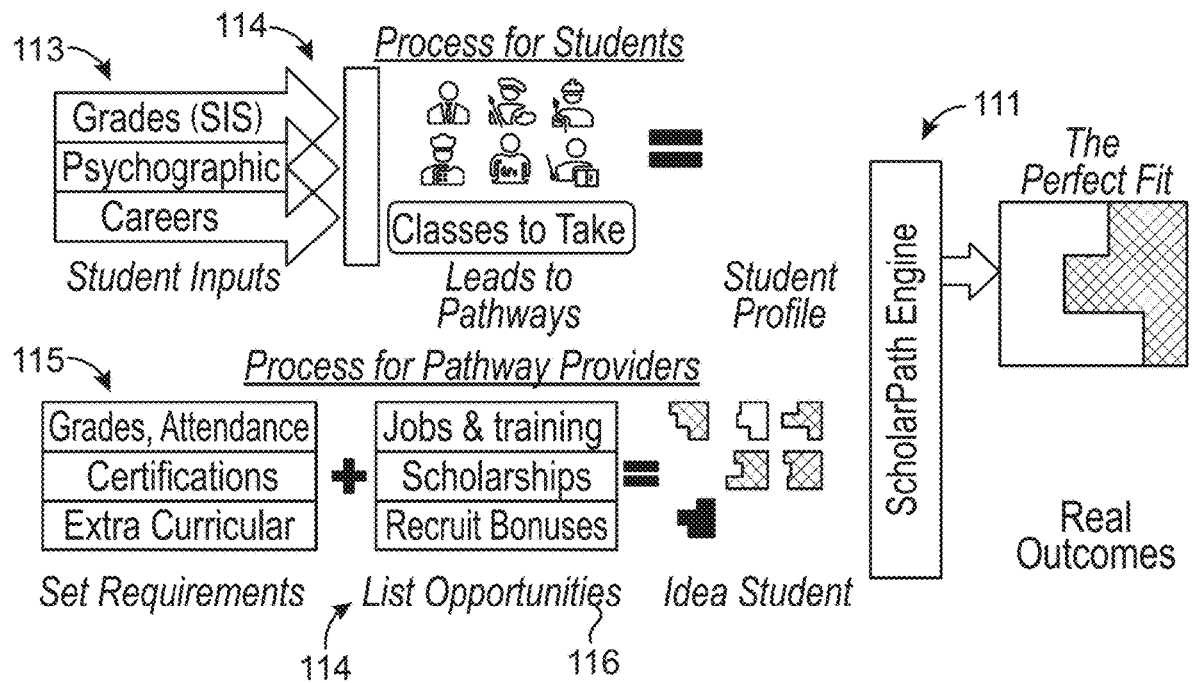
FIG. 1 provides a general schematic of an embodiment of a blinded messaging system according to the present disclosure.

The following detailed description and disclosure illustrates by way of example and not by way of limitation. This description will clearly enable one skilled in the art to make and use the disclosed systems and methods, and describes several embodiments, adaptations, variations, alternatives, and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

At a high level of generality, this disclosure is directed to systems and methods for certain institutions to send blinded messages to an unknown pool of candidates about opportunities while protecting the privacy of the individuals in the pool, and the parties that send and receive the messages.

It is important throughout this disclosure to keep in mind the difference between providing identified information, "de-identified" information, or "anonymous" information. Identified information is information a specific piece of information attached to the specific individual whose it is. For example a spreadsheet of standardized test scores listed by student at a school is identified information as each specific student is attached to a specific test score. De-identified information maintains the specifics of the information element but eliminates the connection to a particular student. For example, taking the names off the same spreadsheet above would de-identify the scores as (assuming they are placed in an order that gives no additional information) one knows the specific scores of each student, but does not know to which student each is connected. Anonymized information eliminates the specifics of both sides. This type of information can be best thought of as statistical information (although it need not be). For example, providing the mean score of the school, standard deviations, the spread, or the like of scores does not provide specifics of any student or any score. In the present case, the system does not provide de-identified information. Instead, it uses identified information to connect anonymously.

This difference can be understood by simple example before this disclosure gets into more complex detail. Let's say an opportunity is provided by a provider which is limited to the students with the top ten scores on a standardized test. In a de-identified information case as identified herein, the provider can be given the test scores of the top ten students. The provider thus knows the scores, but not the students attached to them (or more typically, they will have an identifier identifying the student in a manner that is meaningless to them). Should they wish to follow up, they will typically need to respond to each student individually. This allows them to actually only follow up with the top two students because the provider has been provided the information and makes the determination of who they want to follow-up with.

In an embodiment of the present system and method, the opportunity is provided to the students who got the top ten scores (they have been identified and provided the information because of the identification) but the provider is simply told that 10 students received the information (as requested). The provider, thus, does not know either the score or student and cannot select those to follow-up with. Instead, following-up is in the hands of the students. Should two students contact them about the opportunity, even once the students are positively identified and attached to scores, the provider does not know the relative position of those two students in the top ten. Thus, they are still (in some respects) anonymous.

Throughout this disclosure, the term "opportunities" means job, career, or educational openings or opportunities that one is not generally entitled to by law, but rather must qualify for through an application and vetting process, during which the candidates supply information relevant to the opportunity, which information is then reviewed by a decision-making board to determine which candidate or candidates shall be offered the chance to participate in the opportunity. Examples include job openings and careers in the public or private sector (profit or non-profit), admission to an educational institution (including but not limited to junior colleges, four-year universities, trade and vocational schools, and the like), military postings, positions with government agencies, participation in extra-curricular activities, as well as opportunities to earn awards, recognition, and accolades, such as scholarships, writing competitions, and the like.

Throughout this disclosure, the term "provider(s)" means an enterprise, firm, agency, or other organization having one or more opportunities to offer to one or more candidates. Examples include private employers, non-profit organizations, service organizations, educational institutions, the military, other government agencies, and the like.

Throughout this disclosure, the term "candidate(s)" means an individual or group of individuals who are seeking or otherwise may be interested in a opportunity offered by a provider. Candidates may be un-emancipated minors/children (i.e., under the age of majority for the jurisdiction, which generally 18 in the United States), or emancipated minors or legal adults (who may or may not still rely on parents/guardians for input and direction). The focus of this disclosure is on students, and so candidates are generally students, but a person of ordinary skill in the art will recognize that there may be circumstances outside of the educational system where sending blinded messages in the manner described herein could be useful. The term "parents" means the legal guardians of a non-emancipated minor candidate. The legal guardian is typically the biological or legal parent or parents of the candidate but may also be a legal guardian or other individual with legal authority to represent the interests of the minor candidate.

Throughout this disclosure, the term "blinded" refers to communications prepared by or behalf of a provider, and sent by a provider to a candidate or pool of candidates identified to receive the communication based upon certain criteria defined or selected by the provider in advance related to the characteristics of candidates the provider desires to receive the communication, but the provider does know in advance the identity of the candidate(s) or pool of candidates who are eligible to receive, or actually do receive, the message, except to the extent any recipient(s) contact the provider or otherwise respond to the communication. The recipient candidates usually receive the identity of the provider who sent the communication (typically in the communication itself) but will generally not know that they were specifically targeted for the communication or why they were specifically targeted.

Throughout this disclosure the term "computer" means hardware which generally implements functionality provided by digital computing technology, particularly computing functionality associated with microprocessors. The term "computer" is not intended to be limited to any specific type of computing device, but it is intended (unless otherwise qualified) to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including, but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service (SAAS), or other distributed or collaborative computer networks. Thus, to the extent this disclosure describes systems or methods as being performed by or on a computer, a person of ordinary skill in the art will understand that, unless specified otherwise, the systems and methods may be implemented on a single device or distributed across multiple devices.

Those of ordinary skill in the art also appreciate that some devices not conventionally thought of as "computers" nevertheless exhibit the characteristics of a "computer" in certain contexts. Where such a device is performing the functions of a "computer" as described herein, the term "computer" includes such devices to that extent. Devices of this type include, but are not limited to: network hardware, print servers, file servers, NAS and SAN, load balancers, IoT devices, smart devices, and other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including, without limitation, virtual processors, or by the use of run-time environments, virtual machines, and/or interpreters.

Those of ordinary skill in the art recognize that although software is traditionally stored in a non-transitory computer-readable medium and loaded into memory on demand for execution, software can also be wired or embedded into hardware, including, without limitation, onto a microchip, and still be considered "software" within the meaning of this disclosure. For purposes of this disclosure, software includes, without limitation: instructions stored or storable in hard drives, RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including, but not necessarily limited to, a network socket connection. Those having ordinary skill in the art will further appreciate that a "server" may comprise a plurality of software and/or hardware servers delivering a service or set of services as described elsewhere herein. Those having ordinary skill in the art will further appreciate that the term "host" may, in noun form, refer to an endpoint of a network communication or network (e.g., "a remote host"), or may, in verb form, refer to a server providing a service over a network ("host a website"), or an access point for a service over a network.

Throughout this disclosure, the term "mobile device" and similar terms refers to a specific type of computer, generally a personal, carried mobile communication device such as, but not necessarily limited to, a smart phone, tablet PC, e-reader, or wearable computer such as a smart watch or fitness device, whether of general or specific purpose functionality. Generally speaking, a mobile device is network-enabled and in communication with other network-enabled devices (which may or may not be mobile devices) over one or more networks. A mobile device is usually intended to be in near-constant real-time communication with other devices over such networks while powered on.

Throughout this disclosure, the term "real-time" refers to software operating within short enough operational deadlines for a given event to commence or complete, or for a given module, software, or system to respond, that the responsiveness of the system is, in ordinary user perception within the technological context, effectively cotemporaneous with a reference event. For example, when the user clicks on an interface element, the system exhibits some kind of response that indicates that click was received and is being, or already has been, processed and acted upon. Those of ordinary skill in the art understand that "real-time" does not literally mean the system processes input and/or responds instantaneously, but rather that the system processes and/or responds rapidly enough that the processing or response time is within the general human perception of the passage of real-time in the operational context of the program. Those of ordinary skill in the art understand that, where the operational context is a local graphical user interface, "real-time" normally implies a response time of no more than one second of actual time, with milliseconds or microseconds being preferable. However, those of ordinary skill in the art also understand that, under other operational contexts, a system operating in "real-time" may exhibit delays longer than one second, particularly where network operations are involved.

Described herein, among other things, are systems and methods for a communication platform designed to protect the personal privacy of candidates, provide control and transparency to the parents and/or guardians (when applicable), and facilitate providers to communicate directly with candidates about opportunities the providers offer. As will be clear a person of ordinary skill in the art, the platform uses computers and digital data stored on computers, combined with network access and operations to implement the systems and methods as contemplated herein. The systems and methods may be created as a web site, standalone desktop application, web app, network service, downloadable application, a combination of these technologies, or another structure or implementation suitable for performing the functions described herein.

The platform facilitates messaging to candidates without revealing to the provider the identity of the candidate(s) who are in the pool of potential recipients, information about the candidates other than that they meet certain target criteria of the provider, or who actually receives the messages. The platform thereby facilitates the process of providers recruiting and improving their talent pool and talent acquisition by providing more accurate targeting of provider message to target candidate, while at the same time not providing providers with de-identified data, but with high level more anonymous data to better inform the most relevant candidate population about available opportunities and assist in talent acquisition.

These systems and methods can be used whenever it is desirable to provide personal data to permit a third party to send information to a class of recipients based on selection criteria related to the characteristics of the class members without knowing in advance the identities of the class pool or individual recipients, including but not limited to for respecting the privacy of students in accordance with FERPA guidelines. However, this is by no means limiting and the system could also be used other contexts. By way of example and not limitation, similar techniques could be used to facilitate communications with covered entities under HIPAA. In an embodiment, the use of such blinded communication allows providers to target desired groups where their very act of targeting them could lead to concerns. For example, a provider that is very interested in hiring candidates from a protected class to improve their firm diversity can indicate that targeting, but will be unable to know if that is why a particular candidate followed-up with them until the candidate wishes to indicate that they are a member of the protected class.

Figure 4:
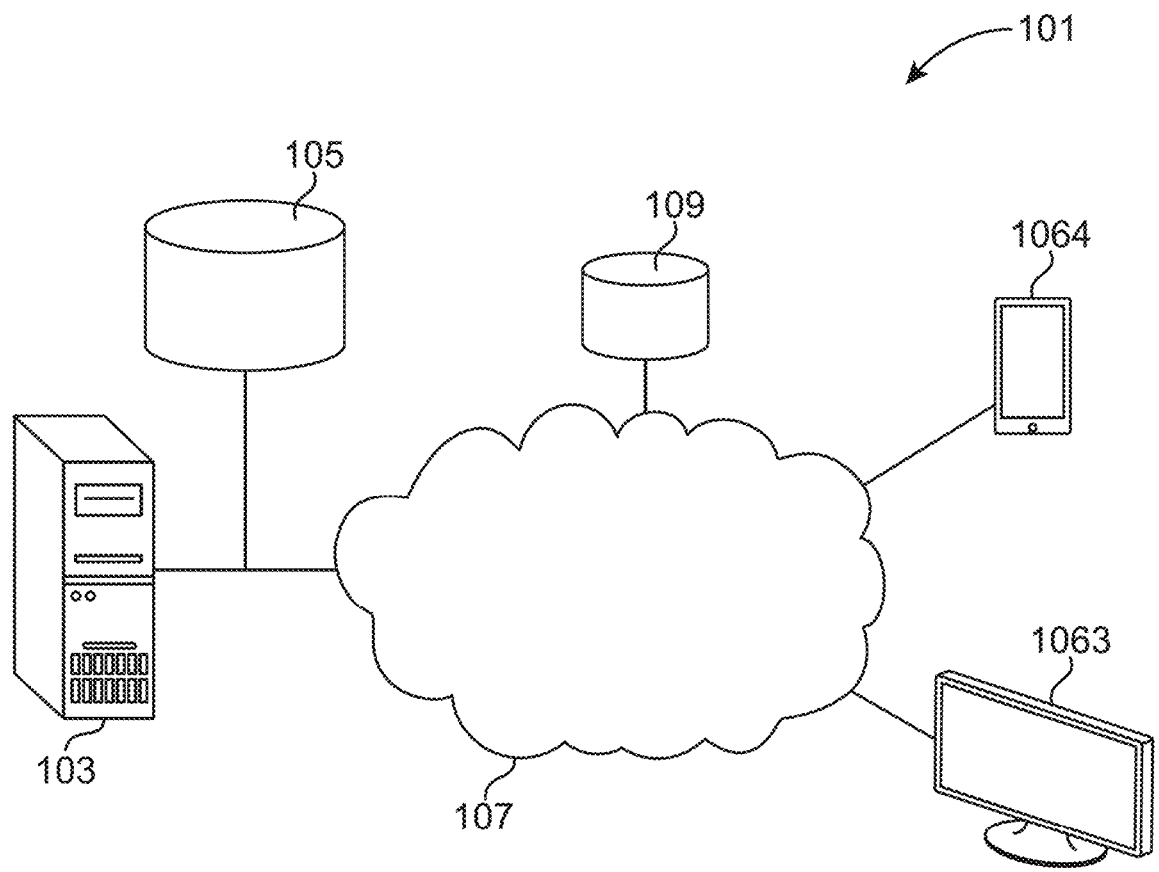
FIG. 4 provides an embodiment of a system for implementing a blinded messaging system according to the present disclosure.

FIG. 4 depicts an exemplary, non-limiting embodiment of a typical architecture for implementing the systems (101) and methods. In the depicted embodiment of FIG. 4, the platform is implemented through a combination of software running on a server computer (103) and on clients, such as a personal mobile devices (106A), or desktop computer (106B). The clients (106A) and (106B) communicate with the server computer (103) via a network (107), generally at least in part the public Internet (107). The server computer (103) is typically connected one or more private databases (105) which directly provide data storage and retrieval as necessary to implement the functionality described herein. The database(s) (105) may be local to the server computer (103) or may be accessible by it over a network connection. Additionally, one or more third party databases (109) may be accessed by the server computer (103) and/or clients (106A) and (106B) to implement the functionality described herein.

Figure 2:
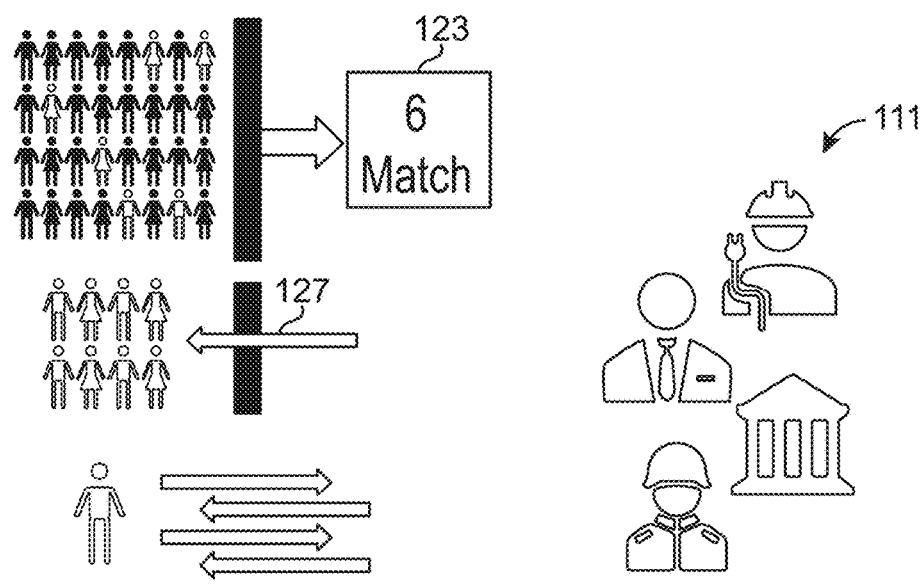
FIG. 2 provides a general schematic of an embodiment of a blinded messaging system according to the present disclosure.
Figure 3:
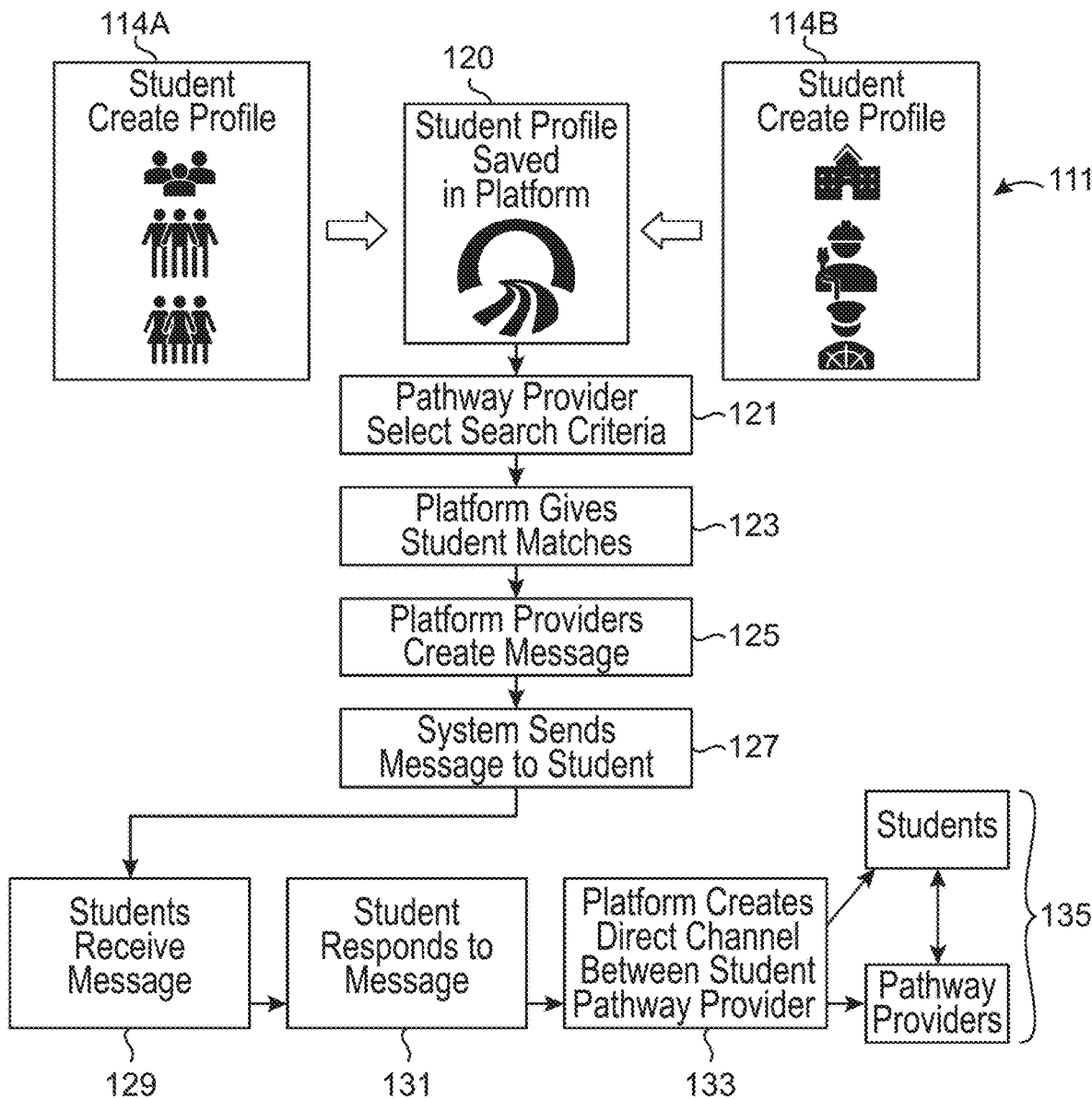
FIG. 3 provides a flow chart of an embodiment of the operation of a blinded messaging system according to the present disclosure.

FIGS. 1-3 depict exemplary, non-limiting embodiments (111) of the methods contemplated herein, which may be carried out by the system (101) depicted in FIG. 4 (or other systems or hardware with suitable architectures to perform the functions described). As can be seen in FIG. 1, conceptually, the methods comprise two parallel tracks (113) and (115) by which candidates on the one hand, and providers on the other hand, supply information to the platform, which is then used to facilitate the blinded messaging described herein. When functions are described herein applicable to either candidates or providers, they may be referred to generically as "users."

Broadly speaking, users create accounts and establish user profiles (114) in the conventional manner that will be familiar to a person of ordinary skill in the art. Once the user creates an account, the user may establish and fill out a profile. The details of these processes (113) and (115) differ for candidates and providers, as described in further detail elsewhere herein. Educational institutions where candidates are currently studying may also act as users in certain embodiments and be provided with their own specific access. Interaction is generally carried out by the user running software on a client device (106A) and (106B) which provides a manipulable interface for providing the information and transmitting it to the server computer (103) for processing and storage in the private database (105).

As shown in FIG. 1, the candidates may establish profiles that include information that is private, and which may also be protected by a privacy law, such as FERPA. This may include educational data, which may be entered or supplied by the candidate, or retrieved directly or indirectly from the candidate's current school's student information system (e.g., a third-party database (109)).

Figure 5:
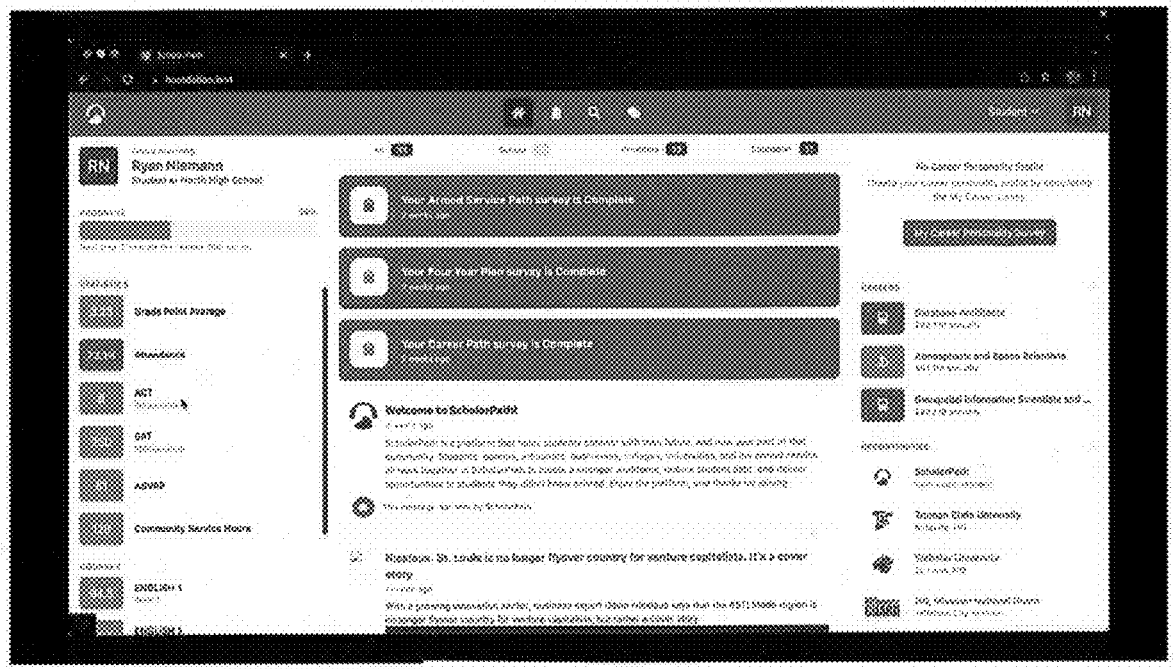
FIG. 5 provides an embodiment of a screen shot of a user dashboard for a candidate. This image shows an activity feed with general news information.

Candidate profiles may be as sparse or as detailed as the candidate wishes them to be. Typically, basic and more universal educational information will be provided in the profile by default. For example, as shown in FIG. 5, grades, standardized test scores, and a course list may be provided for all candidates. Candidates may then choose to research or provide other information to associate with their profile. This may include specific opportunities of interest to them or specific career paths of interest as shown in FIG. 5. This information may then be used by providers as search criteria for blinded messaging as discussed elsewhere herein.

By way of example and not limitation, surveys, questions, or other information collection techniques may be used ask a series of questions or spur provision of information about the candidate from the candidate. This may include demographic information, such as sex, gender identification, race, age, geographic location or state of residence, and national citizenship. These criteria may be relevant to identifying unique opportunities, such as scholarships intended for specific communities. The surveys may also or alternatively collect other information, such as a personal statement and integrations with other social media used by the candidate. The questions may seek information about factors important to the candidate in his or her future endeavors, such as athletics, institution type, institution size, class or office size, environmental factors, location preferences, religious preferences, key interests, political preferences, and demographic preferences, such as single-sex schools and historically black colleges and universities. The surveys may also collect information about candidate accomplishments that are difficult to capture in a structured format, where the candidate can provide unstructured text to describe anything the candidate deems relevant or important. This can range from accomplishments and awards, such as leadership positions in activities, speaking multiple languages, playing an instrument, surviving a serious illness, or completing a triathlon.

In an embodiment, candidates may be presented with or have the option to complete specific third-party surveys commonly used by providers, notably employers, to assess candidates for fit. Examples include personality surveys, such as the Myers-Briggs Type Indicator, and the O*NET career survey. Questions may include, but are not necessarily limited to, the candidate's interest in volunteer, non-profit, or other private service organizations, such as AmeriCorps and the Peace Corps, as well as public service organizations and careers in the public sector. Once completed, the O*NET survey results may be stored in the database (105) as profile data and used by providers to message key talent as described elsewhere herein (e.g., by the matching module).

Figure 6:
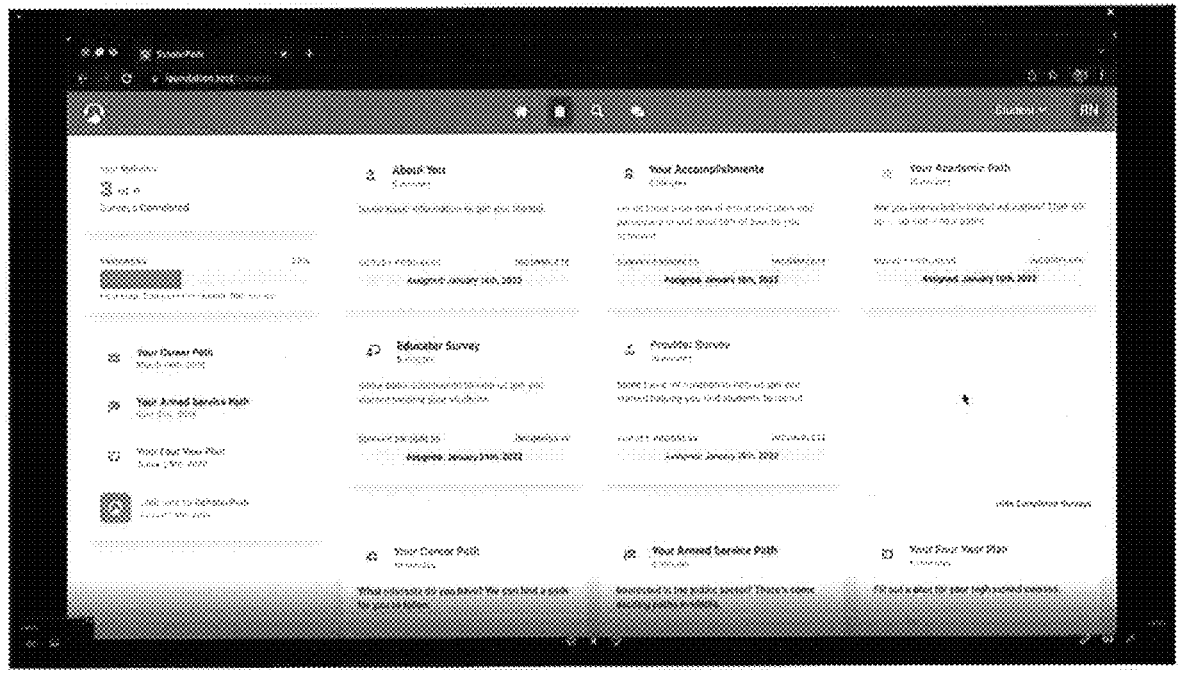
FIG. 6 provides an embodiment of a screen shot of a survey interface.

Candidates filling out specific surveys will generally be provided survey feedback information as shown in FIG. 6. These surveys can be used to collect information that may not be reflected in a students academic performance or known interests and may provide outside "research-based" indicia of career paths that a candidate should consider. The surveys can be of any known type and any number may be included. The more of these filled out, often the more information available to target messages from providers, but also the more information the candidate themselves may use. As all the information is kept from a provider until the candidate choses to reveal it, there is an incentive for a candidate to add more information to both improve their profile as a potential target and make sure that relevant opportunities target them and so that they themselves can use the myriad pieces of information to better understand their own interests.

Figure 7:
FIG. 7 provides an embodiment of a screen shot displaying the results of a candidate's assessment examination.

As an example of using a candidate's information, in FIG. 7 the candidate has done an established assessment exam for career aptitude. These types of tests are often available to students, but the students are often limited to receiving from them only the basic categories of potential interest shown in FIG. 7. In the present system, this information may be used for targeting of opportunities which, as discussed later, can add concreteness to the abstract categories provided. Further, the interconnectedness of information about the various aspects of the candidate collected from the various sources can be used together by the candidate to research and discover still more potential aspects of their potential interests and investigate opportunities they may not have previously considered.

In an embodiment, the matching module may use candidate profile data, including survey response data, and weight specific personality traits to create an individualized career interest profile for the candidate with best-matching careers. For any given career, the matching module may be programmed to display to the user a visual representation of the candidate's personality traits (as measured by the survey), and how those traits align with a given career. This may be done, for example, using a "radar" visualization. This individualized career interest profile may be saved to the database and be viewed by the candidate later, as well as parents and educators.

The private database (105) may also include other data. By way of example and not limitation, the private database (105) may comprise datasets about opportunities (116) associated with specific providers. This information may be supplied by the providers themselves or may be downloaded or otherwise collected from one or more third party databases (109), such as via an API, screen scraper, or other technique. By way of example and not limitation, one such third party database (109) is O*NET, a database for careers and occupations of the United States.

The private database (105) may also comprise data comprising career profiles. A career profile is a general outline of a career, including the general qualifications for it, to help candidates develop an understanding of the requirements, and information about providers who have opportunities in that career and the specific types of jobs available. For example, the database (105) may include a career profile for a veterinarian, and describe the educational requirements, licensing requirements, and other steps generally required to have a career in veterinary science, and may include examples of careers for veterinarians (domestic pets, conservation and wildlife, laboratory practice, research, ranch/farm practice, aquatic, etc.), specific opportunities and the providers who offer them (e.g., academic institutions with veterinary science programs and/or certification programs for specific areas of interest, or employers or government agencies with job openings for qualified candidates). The profile may also include data or other statistics about the career, including but not necessarily limited to educational cost and duration, training cost and duration, certification and/or licensing requirements, salary data (e.g., average starting salary for various jobs, salary after 5 years, 10 years, etc.)., and long-term opportunities beyond entry-level positions and the general requirements to qualify for them.

Figure 8:
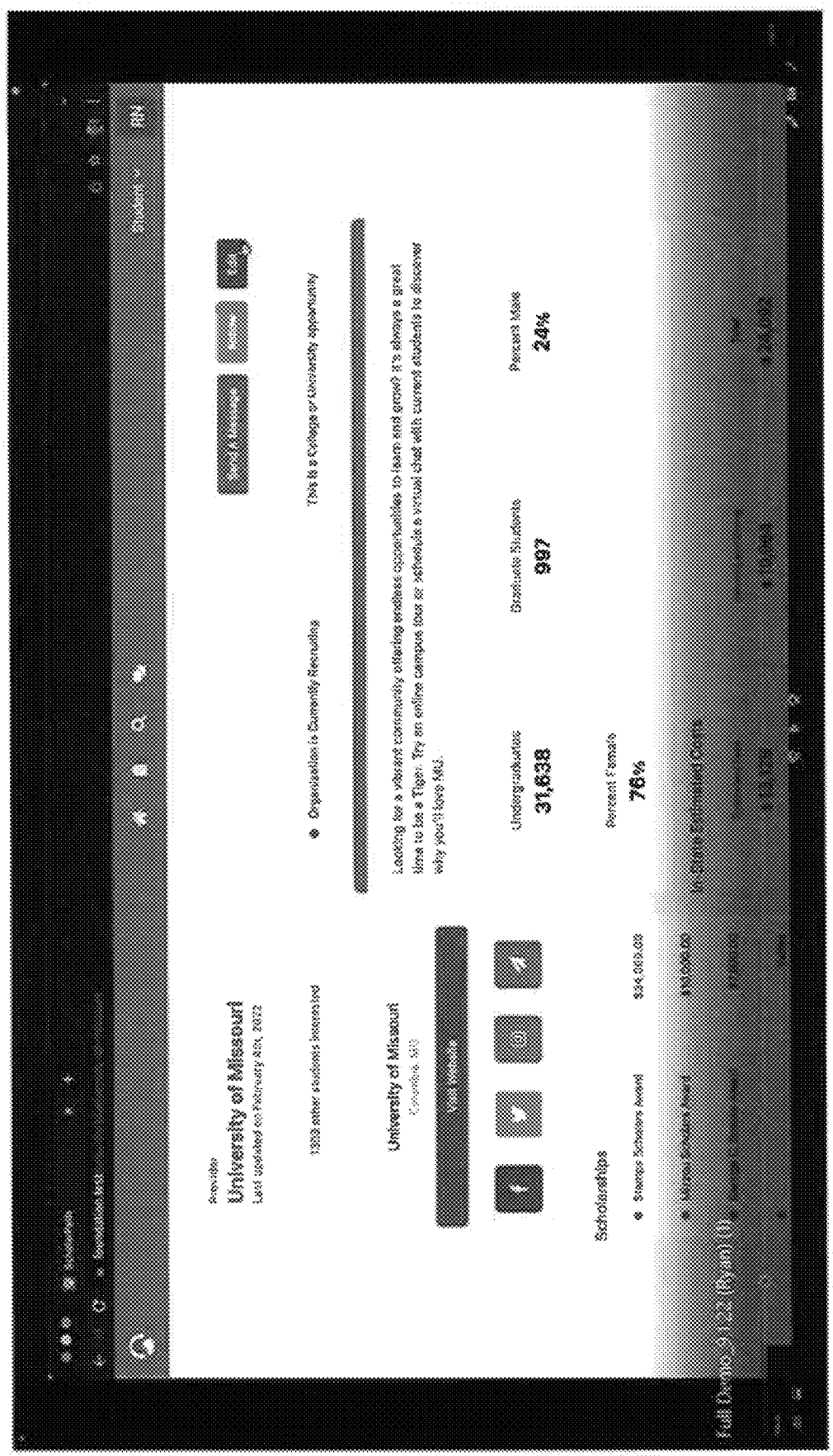
FIG. 8 provides an embodiment of a screen shot of a provider page for a provider of higher education.
Figure 9:
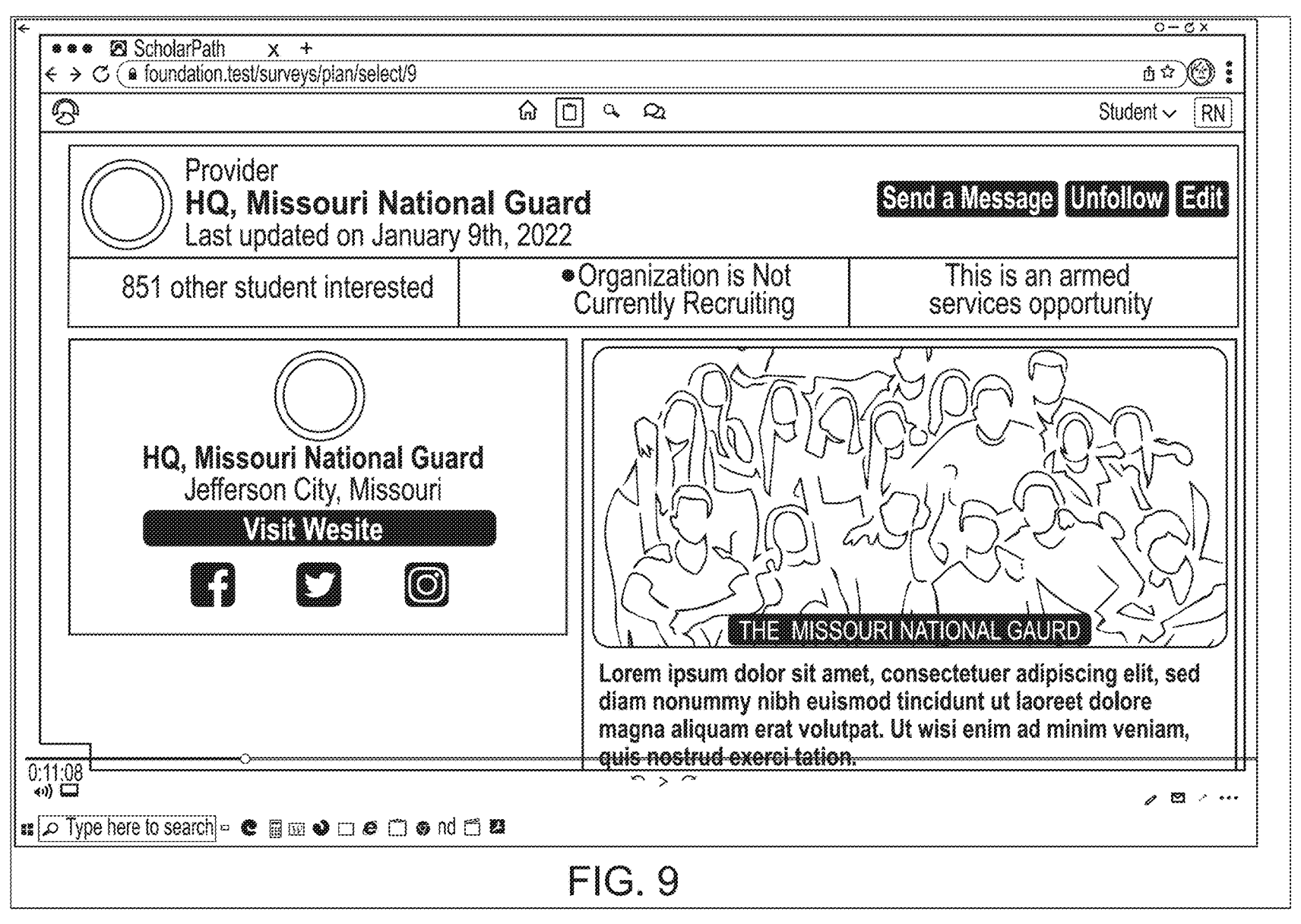
Figure 10:
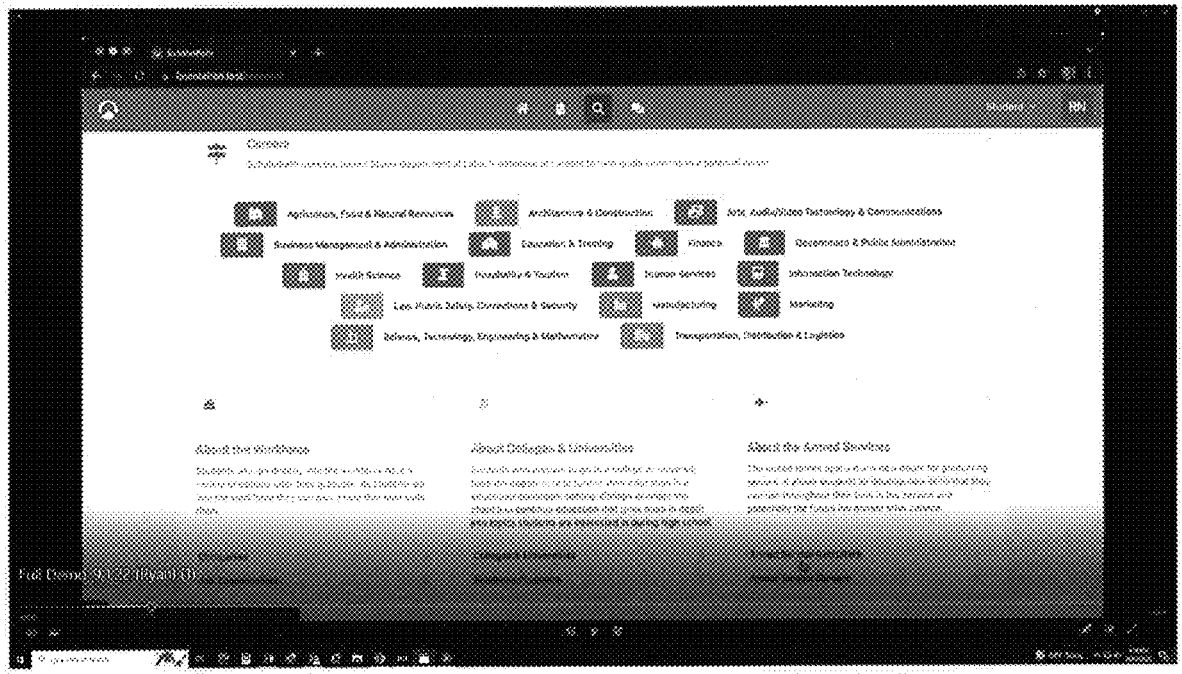
FIG. 10 provides an embodiment of a screen shot of how provider research may be performed by a candidate.

As discussed above, any user may have a profile and customize their profile (114), (114A) and (114B). Providers may create profiles (114B) to market and promote themselves and the opportunities they offer. Career profiles (114B) may also be associated in the database (105) with providers who have opportunities related to that career profile. An implementation may include a profile page for the provider with various options for other users (generally candidates but potentially also other providers) to interact with the provider or the provider profile, such as direct messaging, and social networking conventions, such as bookmarking, liking, favoring, subscribing, following, and the like. FIGS. 8 and FIG. 9 provide for two examples of a provider profile page. FIG. 10 provides a general indication of how research of provider pages may be performed by a candidate from their profile page should they wish to investigate any particular career path or opportunity option.

By way of example and not limitation, a university may have a profile for its veterinary science degree program, which interested candidates can reference to conduct research about the program and its qualifications, cost, and timeline. The provider profile may also include references to notable people in the field who are associated with the program, such as respected researchers, professors, or alumni. Other providers with downstream opportunities in that field, such as laboratories, researchers, and wildlife conservative organizations, might also link to or associate with the university program page, providing a connection of independent providers within the same career profile, each of which represents a step along the pathway of that career. By allowing a plurality of providers to link to the career profile and/or each other, a network of pathways is created organically within the database (105) to represent a variety of different manners in which a candidate might approach a given career, while also providing candidates a view of the general landscape of the career and field, including key or central players.

For some opportunities, a single provider may comprise the entire pathway through the career. For example, a career in the Armed Forces generally begin with enlistment or commission and the candidate proceeds through a full career in one organization (e.g., the Air Force). Some careers, such as in the military and certain types of government agencies (e.g., the United States Patent and Trademark Office) have only one pathway defined by the organization. For example, there is only one USPTO and if one wishes to become a United States patent examiner, there is only one employer for that position. In other instances, a specific provider may have a unique or unusual pathway for a career to offer or may simply wish to custom-define a specific pathway to better define the qualifications desired for the opportunities that provider offers. Likewise, specific opportunities such as scholarships may have a very specific set of requirements to qualify. Such pathways are defined by the providers who offer them and also stored in the database (105), where they can be searched and viewed by other users. Again, such pathways may comprise employment, academic, educational, vocational, or other training opportunities. In an embodiment, they may be linked to career profiles and the provider(s) offering them.

FIG. 8 and FIG. 9 provide for screenshot examples of different providers. FIG. 8 provides for a provider of higher education, while FIG. 9 is for a provider of military service. In the depicted embodiment, it should be noted that the pages are broadly similar in layout and available information. This type of commonality allows for a removal of difference based on the type of provider referenced. In many systems, and educational provider would have a different template to start with than a military service provider. This creates a problem of differentiating the providers just from how they appear and can result in unintended preference by the candidate for one or the other. In the embodiment of FIG. 8 and FIG. 9, presentation of the two options in a similar way helps to place them on equal footing.

One manner in which the platform differs from a conventional service of this type is that candidate user interactions are generally anonymized. That is, when a candidate user (even a user who has set up a profile and whose identify is known and confirmed) is authenticated and logged into the platform, and interacts with a career profile, provider profile, or career pathway, the interaction may be noted and stored in the database (105) and be accessible and retrievable by the candidate user, but the identity of the candidate user, and even specifics of their information disconnected from their identity (e.g. de-identified data) is not provided or made available to the provider user. Instead, the provider user is typically provided with anonymized or statistical data where the specific candidate is one of a larger group of candidates that would meet the same criteria.

Thus, providers cannot, for example, retrieve or access a list of candidate users who have "Liked" or even visited the provider user's profile page or any associated career profiles or pathways. Providers can collect only de-identified, anonymous data at the aggregate level (e.g., the total number of candidate users who have "Liked" the provider's profile or a particular career or pathway offered by the provider). In an embodiment, the provider may also be able to access other aggregate data about that population, again on an anonymous basis that does not reveal any protected or private personal information or details about any one user. This could include, for example the average high school grade point average of the candidate's defined population. In a situation where the population of users is small enough that it might be possible to identify the user (e.g., the problem of small sample sizes), even that information may be withheld from providers until the population size reaches a large enough size that conclusion inferences cannot be drawn from it.

As an example, in the user dashboard of FIG. 5, the user has indicated a series of "liked" opportunities including one from a company (SchlorPath), two educational institutions (Truman State University, Webster University), and one military opportunity (The Missouri National Guard), typically, the fact that these have been liked will influence what messages are received. For example, all relevant messages from such liked providers may be sent to this candidate. At the same time, these providers will typically have no indication that this specific candidate has liked them. The provider may have gotten notification that a specific opportunity was liked by a candidate, but that will typically only come with the indication that it was by a candidate to which it was targeted (e.g. that met specific targeting criteria for that opportunity set by the company) or by a candidate within broad categories, such as one located in the state of Missouri. This gives the provider no information beyond that a candidate in a broad category of candidates was apparently correctly targeted or otherwise located.

In an embodiment, providers may create an "ideal candidate" profile for a given opportunity, career, or pathway. This profile may include preferences or requirements based on grades, attendance, certifications, extracurricular activities, candidate interest, and present available jobs or internship programs. As previously described, this information may be made available in connection with the provider profile, and/or with relevant career profiles or pathways, permitting candidates to research careers, pathways, and associated providers to plan for a career (e.g., learn which classes to take and the grades and certifications they will need to achieve to pursue and fund that career or get a job in it).

In an embodiment, and as shown in FIG. 2, providers may have access to a broadcast messaging function, which is designed to give providers the ability to send out targeted communications to a group of recipients defined by criteria selected (121) by the provider, but without sharing with the provider any information about any of the candidate users in the pool of potential recipients, or any candidate users who actually receive the communication in question. The criteria that providers may use to identify the population is limited only by the data collected from candidate users and stored by the system.

Figure 11:
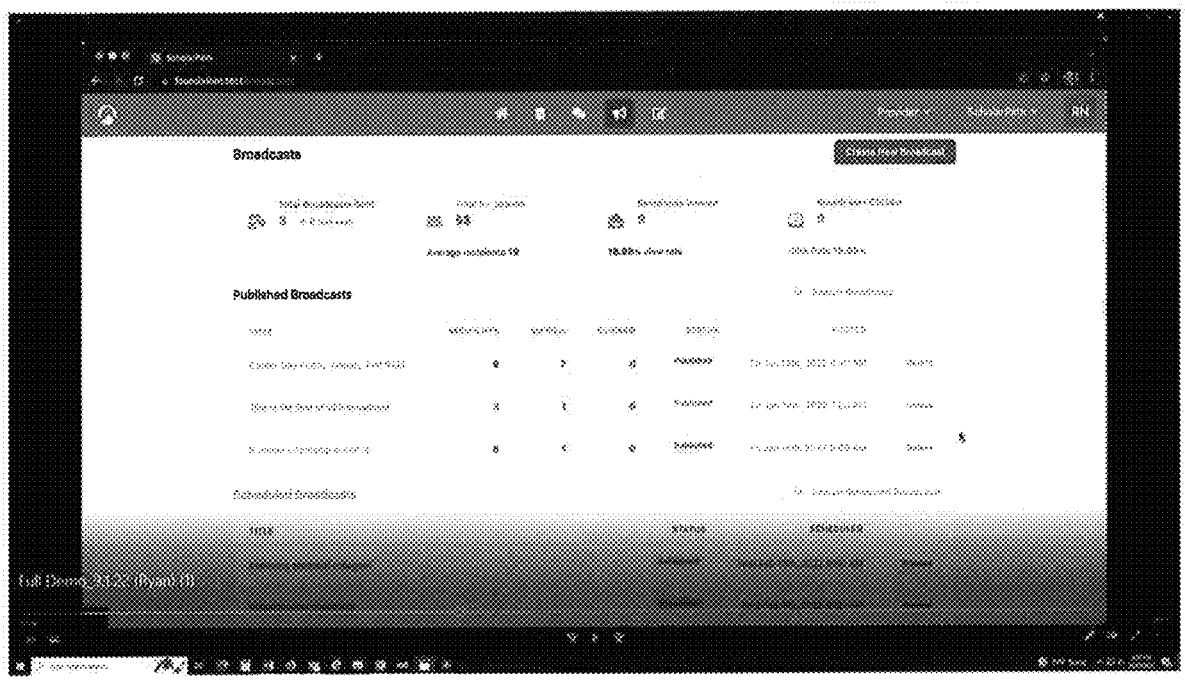
FIG. 11 provides an embodiment of a screen shot of how broadcast messages may be sent.

FIG. 11 provides an indication of how broadcast messages may be used. In FIG. 11, the provider has prepared a number of broadcasts. Some of these have been sent, while others have been prepared but not yet sent. In the latter case, these may be scheduled to be broadcast at a particular time in the future. With regards to sent messages, the provider may be provided with general information on their broadcasts. This can include the number of candidates that received the broadcast and how many of those candidates interacted with it in a particular way. As can be seen from FIG. 11 and as discussed previously, the information is typically provided in the form of high level numbers as opposed to indicating any particular candidate showed interest. This allows for the provider to obtain general metrics as to effectiveness of the broadcast on a target audience without revealing anything about the candidates in the audience that interacted with it versus those that did not.

It should be noted, as shown in FIG. 11, that not every broadcast has the same number of recipients. This is logical as the provider may indicate different criteria for different messages, and the system may locate different relevant candidates to receive different types of broadcasts. Further, certain criteria (such as if a candidate has "liked" the provider) which can be used for selection may change over time resulting in temporal differences in who receives broadcasts from the same provider.

As a simple example of a broadcast message, a veterinary science program may be aware that a state fair is approaching in a state with a strong farming and ranching economy and be sponsoring the fair or representatives of the program may be attending the fair. The provider may draft a communication message intended for students who live in the zip codes nearest the state fair, who are juniors or seniors in high school, and who have high enough GPAs to be eligible for the program. This message can be sent to matching candidate users by the platform, but without information to the provider of which specific users match those criteria, or which specific users received the message. In an embodiment, the provider might be provided with a number, or approximate number, of candidate users that meet the criteria, but again, even this information may be withheld if the criteria are specific enough, and/or the resulting sample size is small enough, that inferences about identity could be drawn from the number alone. In an embodiment, this number is 20. In another embodiment, this minimum is 30. The specific number may vary in other embodiments. This prevents a provider from abusing the law of small numbers to obtain protected personal information about individual users. Notably, the interface design and security design of the server and database also inhibit the provider from being able to retrieve a list of candidates who received the message or otherwise matched the criteria. As described above, this type of messaging is referred to as "blinded" messaging because although the provider can select the type of candidate to receive it, the provider cannot see which candidates actually receive it, or even specifics of the candidates within the broad criteria the provider selected for whom to send it to.

By way of further non-limiting examples, selection criteria (121) may include an interest in a specific provider (as collected via the surveys described elsewhere herein in connection with establishing the candidate profile), such as a specific college or university, a particular vocational union, or a particular government agency such as the Armed Forces or the National Parks. By way of a still further non-limiting example, selection criteria (121) may include a candidate's interest in a specific career offered by a provider, such as civil engineering, HVAC, commercial construction, CNC machinist, or nurse. By way of a still further non-limiting example, selection criteria (121) may include a candidate's specific high school, grade level, and/or or residence in a specific Metropolitan Statistical Area.

The matching between selection criteria (121) and stored candidate profiles (120) is generally performed by the server computer (103), which is outside the direct control of the providers, and which can conduct the matching specifically using identified information (that is, the third party actually does know the specific information and/or actual identity of the candidate receiving the information) but with the result returned to the provider anonymously (123) and without the provider learning the identifies, or even specific informational elements, of the recipients. The provider also prepares a message (125) to be sent and the server computer (103) sends the message to the matching candidates (127). To provide an additional level of anonymity, the message (125) may also be sent to a certain number of non-matching candidates (127) selected by the server computer (103). This may serve to confuse any attempt by a provider to game the system.

In an embodiment, the system is also programmed to automatically generate broadcast messages related to specific careers or pathways. Such messages may be issued by the system itself, rather than originating from a provider, and may also be targeted to specific populations in the same general manner and provider supplied broadcasts, or even to specific candidates. By way of non-limiting examples, such system broadcasts may include: new provider matches as providers join the platform and/or the candidate adds to or modifies his or her candidate profile and/or completes or updates surveys; new provider updates and matches based on the candidate's performance (e.g., updated grades, GPA, certifications, courses completed, etc.); current employment opportunities from local employers or trades based on the candidate's location and profile information; current recruitment opportunities from government agencies, law enforcement, and/or military branches; and, available externship/ internship/job shadowing/co-op opportunities.

Figure 12:
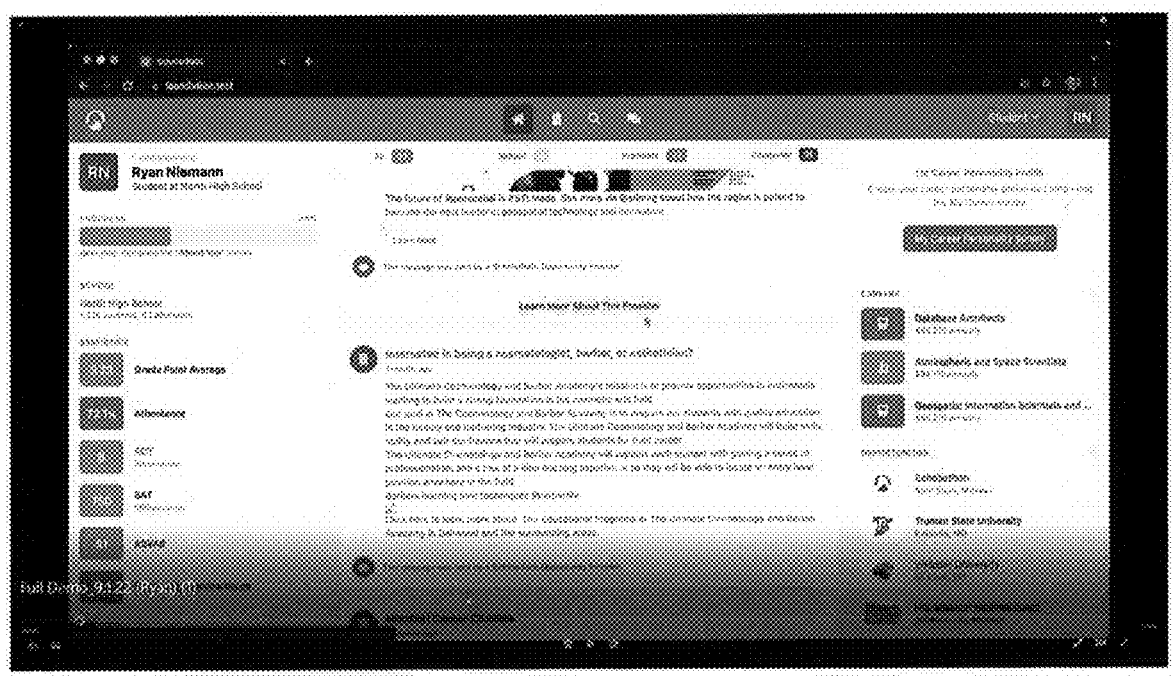
FIG. 12 provides an embodiment of a screen shot of a user dashboard for a candidate. This image shows an activity feed with a broadcast from an educational institution.
Figure 13:
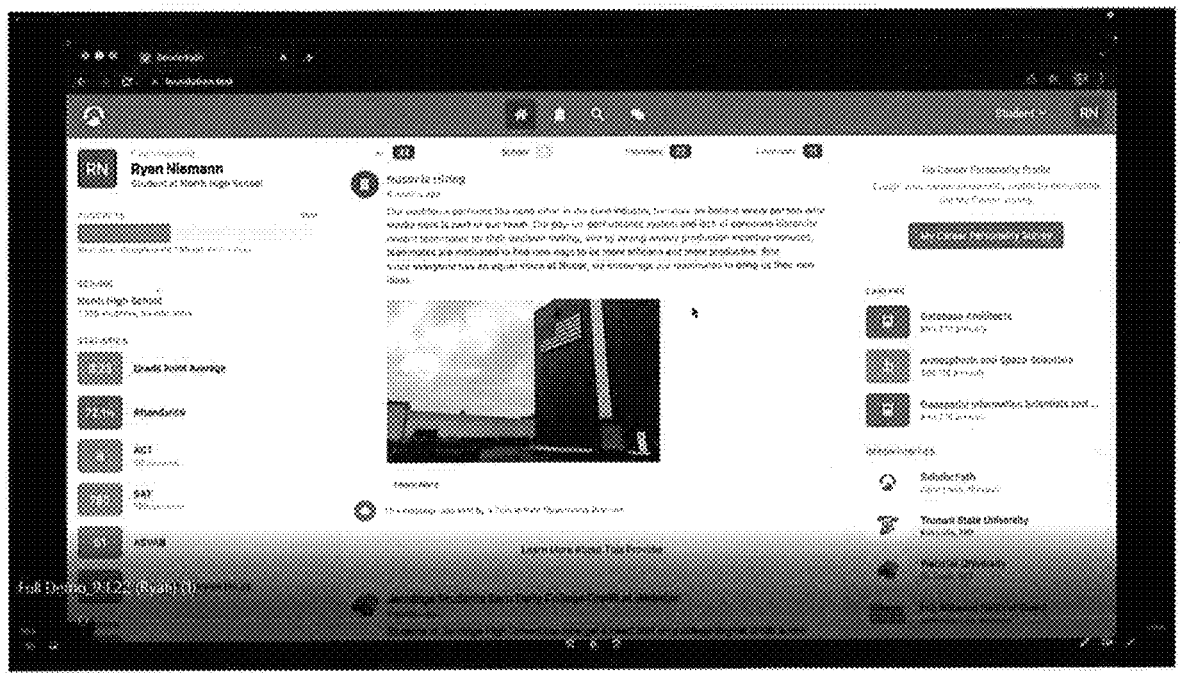
FIG. 13 provides an embodiment of a screen shot of a user dashboard for a candidate. This image shows an activity feed with a broadcast from an employer.

FIG. 5, FIG. 12, and FIG. 13 provide some general indications of how the interaction appears on the candidate side of the user experience, such messages are received (129) by the candidate and may appear in the user interface on the client device (106A) or (106B), such as in an activity feed. As an example, FIG. 5, shows the activity feed with items of general interest including a welcome note from the system and a news article. FIG. 12 on the other hand shows an interaction which is from the Ultimate Cosmetology and Barber Academy (an academic institution) discussing the benefits of them as an education source and that particular career. FIG. 13 finally shows a job opportunity at a steel plant discussing working in the steel industry. The user can read and then interact (131) with any of the messages (again, anonymously and without revealing his or her identify or personal details) to get more information about it. The content of the communication may be whatever the provider desires to share, such as promoting events or simply sharing information about careers and/or pathways the provider offers.

By way of example and not limitation, candidate uses may also be able to RSVP (131) to provider events (again, anonymously, but giving the provider a headcount), which can assist providers in evaluating candidate interest in different types of events, as well as engaging in event planning for the number of attendees (e.g., renting a large enough venue, ordering enough food, having enough staff, etc.). The content may also include links back to the provider's profile as indicated in FIG. 8 or FIG. 9.

Candidate users may also have the ability to respond to (131) or otherwise communicate with (135) a provider, such as via a direct message interface (133), or an "ask us a question" interface. Such communications may be made anonymously, allowing the provider to respond or reply to the question or inquiry, again without knowing the specific identity of the candidate. Alternatively, if the candidate desires, and only at the candidate's (or additionally the candidate's parents') election, the communication may be made non-anonymously.

Providers will typically be required to agree to certain terms of service before engaging in communication and authorization can be revoked at any time if the provider is found to be in violation of these terms or attempting to circumvent the security protections that prevent unauthorized access to protected personal information. Likewise, candidate users must agree to certain terms, which the candidate user can do directly if he or she can verify that he or she has reached the age of majority, or, if not, a parental approval process may be used, in which case parental approval may also be required for the candidate to engage in any non-anonymous interactions on the platform. In an alternative embodiment, a parent may be able to give a blanket authorization for such communications so that communication is not slowed or inhibited unnecessarily. If the candidate user cannot be verified as being at least 18 years or age or approved to use the platform by a parent, the candidate has "read only" access to the platform and can use it for research but cannot interact or communicate with others.

Depending on the candidate's preferences, should a particular message resonate with them, the candidate may choose to reveal some or all information about themselves to the provider. This may be in a de-identified fashion (e.g. the user may reveal an actual course grade as opposed to simply that it was "passing") or identified (e.g. who they are). It should be recognized that as can be seen in, for example, FIG. 13, the broadcast message provided by the provider typically does not indicate why the candidate is being provided with the message. This serves two functions. In the first, it allows for untargeted messages to be provided which may result in interest from candidates outside those expected. This can lead to refinement of targeting methodology by a provider if it occurs frequently enough. Further, it means that the candidate is generally unaware why this particular provider is interested in them. This means that the user may not be predisposed to not consider an opportunity of interest because they are concerned about why they are being offered it. Thus, the dual blinding of both parties about why this provider's message is going to this candidate can result in a less biased treatment of both sides by the other.

Revealing of information by the candidate will often be piecemeal where certain more general information is revealed first with more specific information being revealed if the conversation continues. As part of this reveal of information by the candidate to the provider, the provider may also reveal the specific aspects of the applicant's profile that resulted in them getting the message and being of interest to the provider. This can result in the applicant obtaining a better understanding of what may be of interest about them to the provider.

Compare the messages of FIG. 12 to FIG. 13. These messages are to very different types of offers and likely represent recruitment of different types of candidates. However, if both messages are targeted based on the profile of the candidate, the candidate falls into the interest of both providers (at least to the extent that the provider indicated preferences in their targeting criteria) and that may be due to different parts of their profile being of interest to the two different providers. Should one of these messages be of interest, but the other is not, the applicant learning what the criteria were for them receiving either message may influence their understanding of the importance of different factors of their personality to different providers. Alternatively, finding that they are based on overlapping criteria, may also cause a candidate to potentially reevaluate a message that was previously not of interest as they realize how it connects to them. This can help deal with problems of interpreting results from surveys and the like that are intended to reveal aptitude and interest in particular professions, but whose results are often abstract.

One of the problems with many prior systems for determining career paths is that the results were little better than indicating that the applicant was a complex human being who may have conflicting interests. For example, in a test where a user is provided with relative weights of their interest on five different facets such as that shown in FIG. 7, an applicant that had a sharp well-defined peak in one area was rare, but often had a clearer interest set. However, most applicants, as in FIG. 7 are complex mixtures of all the facets. While this can lead to specific suggestions based on those mixtures as indicated in FIG. 7, determining actual interest in categories is often not as valuable to the applicant as determining actual interest in a specific opportunity, and the reasons how that opportunity fits with their profile. This can help better show connection.

As an example, the two broadcasts shown in FIG. 12 and FIG. 13 appear widely different. At the same time, one could see that if they both are targeted to candidates that have career indications related to working directly with their hands, they can overlap. Should a candidate receive an aptitude test indicating that handiwork is potentially of interest to them, they may think of cosmetology as a career option, but not necessarily steel work as the heavy industry nature of steelwork does not immediately lend itself to be associated with the term handiwork in many people's eyes.

Should a candidate become sufficiently interested in an opportunity, in an embodiment, a candidate user and provider may initiate a private communication session (133), which may be carried out in real-time or on a "post" basis (i.e., a bulletin-board style). This may only be done by the candidate user initiating the communication, at which point the platform creates a communication "room" or "channel" (133) associated with a unique identifying code. This code may be automatically generated or created by the candidate and shared with the provider. The "room" is only available and accessible to the candidate user and the invited provider and can be closed at any time by either participant. Again, this may be done anonymously, meaning that the provider does not receive the name or any other personal information of the candidate. In an embodiment, the system monitors candidate user input in real-time and if the candidate is detected as attempting to provide any personally identifying details, such as his or her name or location or other information stored in the candidate user profile, the platform may automatically excise that information from the communication so that it does not ever reach the provider. This may be done using any number of techniques, ranging from (but not limited to) regular expression text matching to fuzzy matching to natural language processing. In an embodiment, an anonymous "handle" or nickname may be selected by the candidate user and displayed in such communications to preserve the candidate's anonymity, or a handle may be automatically generated by the platform. Alternatively, in certain situations, the candidate may be able to provide his or her first name and possibly last initial to avoid confusion.

Messages sent to the room are first stored in the private database (105) and the content is encoded or encrypted or stored in an encoded or encrypted storage medium. To achieve push notifications and limit the exposure of protected or private information, a push notification is created which contains only an anonymized identifier for the candidate user, and a unique identification number of the message. The anonymized identifier for the candidate user may be a unique identification number, handle, blanks, punctuation (e.g., asterisks), or the like. When the provider's client device receives the unique identification number of the message, it requests that the server transmit the room identification and message content securely from the system's database (e.g., via an encrypted network connection). This prevents the provider from learning the identity of the candidate who sent a message (or will receive the provider's response), as well as the message communicated.

In an embodiment, the system may be designed such that a parent, and/or teachers, counselors, or other advisors, can securely view the communications to and from a candidate user. This does not run afoul of regulatory requirements for privacy because such individuals are generally authorized to access and view the candidate's educational records in any event. Moreover, this feature provides transparency to ensure that providers are not attempting to learn identification information inappropriately, and that the platform is not being used improperly or for nefarious purposes. System administrators for either the server computer (103) software or the operating system or database itself may also have the technical ability to view communications and monitor for violations or problems, and/or respond to third party legal queries related to such violations.

In an alternative embodiment, the system may be configured so that candidates (on their own volition if at least 18, or with parental consent if not) may authorize the system to release contact information to a specific provider. This can typically only be done by the candidate at their initiative. Providers are generally discouraged from encouraging candidates to do so and may even be prohibited by the terms and conditions from doing so. Communications may be monitored for any such improper solicitation of personal information and violators may be removed or banned from further participation in the platform. In such an embodiment, the candidate may also have the option (again, on his or her own volition if at least 18, or with parental consent otherwise) to share other private or protected information, such as the information supplied in connection with the candidate user profile (e.g., grades, GPA, attendance, classes taken, certifications and test scores, etc.). The user may be able to choose specific information to share, to share all information, or share only categories of information (e.g., share grades and classes but not address or location). In an embodiment, such information may be displayed or made available to providers in a manner that makes it difficult or impossible to export, transfer, or copy the data off the system. As described elsewhere herein, for minors, parents may be able to monitor all messaging to the candidates to ensure transparency and propriety.

Another aspect of the systems and methods is that data files exchanged through the platform may be automatically cleansed of some or all metadata. This also helps to preserve anonymity by removing hidden sources of personal information. For instance, a photo taken on a candidate user's mobile device may contain EXIF data, which is additional metadata associated with the photo that can contain information about the device used to take it, including geographic location, date and time, and other information. Likewise, word processing and spreadsheet software can encode information about authors and editors. All such information may be automatically scrubbed from files that are uploaded to the platform at all, and particularly if shared with a provider. Likewise, the aforementioned editing process may be used to eliminate international or inadvertent disclosures of personal information via such documents (e.g., such as by reviewing document text for the candidate's name or using image recognition technology to search image data for the candidate's name and blurring it out or removing it).

The platform may be implemented as a set of one or more modules. For example, in an embodiment, the system may be comprised of one or more of the following: a candidate module (programmed to provide the candidate user experience and functionality), a providers module (programmed to provide the provider user experience and functionality), a matching engine (programmed to identify candidates who match provider criteria as described elsewhere herein), a private database (105), and a communications module (for secure and private communications as described elsewhere herein).

In an embodiment, the platform is made available to high school students. In another embodiment, the platform is made available to college students. In a still further embodiment, the platform is provided to candidates at an academic institution through the institution's on-campus network or as a service in connection with career counseling and other post-graduate planning curricula. An academic institution may also create candidate profiles for each student to facilitate adoption, and the school itself may register a provider to facilitate communication, such as announcing career fairs and other providers visiting campus. In this embodiment, the school can pre-load and automatically update the candidate profile, saving the candidate time, hassle, and maintaining accurate, up-to-date records.

Returning to the profile creation process, providers may also set up profiles (i.e., using the provider module). For college and universities, the provider module may connect to a third-party database (109) to automatically populate certain key fields. For example, if the provider type is a college or university, the module may pull in data from the National Center for Education Statistics. Other providers may be pre-populated on the database, such as providers who are the only source of a particular career (e.g., military service and government bureaus).

The provider may then add information about the provider, including multimedia content, as well as information about specific opportunities that might be available. As an example, an employer can add information on a specific job open to high school students. The Army may add information on a specific career need, such as a heavy equipment operator, satellite operator for Space Command, or mechanic. The provider generally specifies the required educational attainment for a specific opportunity. For careers that have a general career profile, the data may be populated by default with the requirements for the career more generally, allowing candidates to compare the requirements for the specific position to the career generally. The provider may also be able to specify traits or characteristics that are desirable for the ideal candidate (i.e., via the "ideal candidate profile" feature described elsewhere).

In an embodiment, the platform includes a benchmarking feature, through which providers may ask its existing employees/students/recruits/etc. to fill out the surveys in order to "benchmark" how the surveys are typically completed by people who are successful and happy in the career. This information can then be used to construct the "ideal candidate" profile or send blinded communications to preferred candidates.

Once the provider has created a profile and added opportunities, the provider is able to access the communications module of the platform, through which the pathway provider may select criteria to query the platform for matching candidates as described elsewhere herein. This includes sending blinded messages to the targeted candidates as described elsewhere herein.

In an embodiment of the system, the candidate also has the opportunity to interact with the educational institution they are at currently to select a course of study to better prepare them to exit their educational institution better prepared to pursue that opportunity. Further, the educational institution they are at may also have access to the system to allow them to provide and control access to certain information, to generate broadcasts of their own (e.g. to notify students of an assembly), or to both recruit new students while simultaneously encouraging graduates to pursue new opportunities (making them both an educational institution and a provider on the system)

Figure 14:
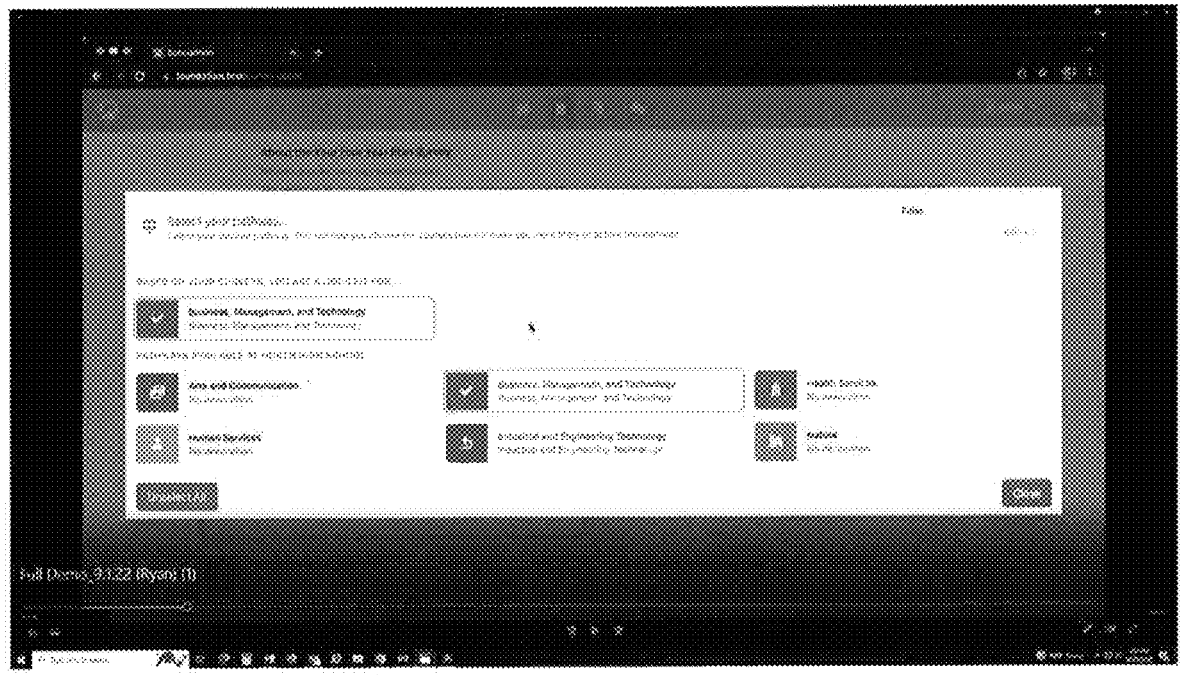
FIG. 14 provides an embodiment of a screen shot of selection of a pathway.
Figure 15:
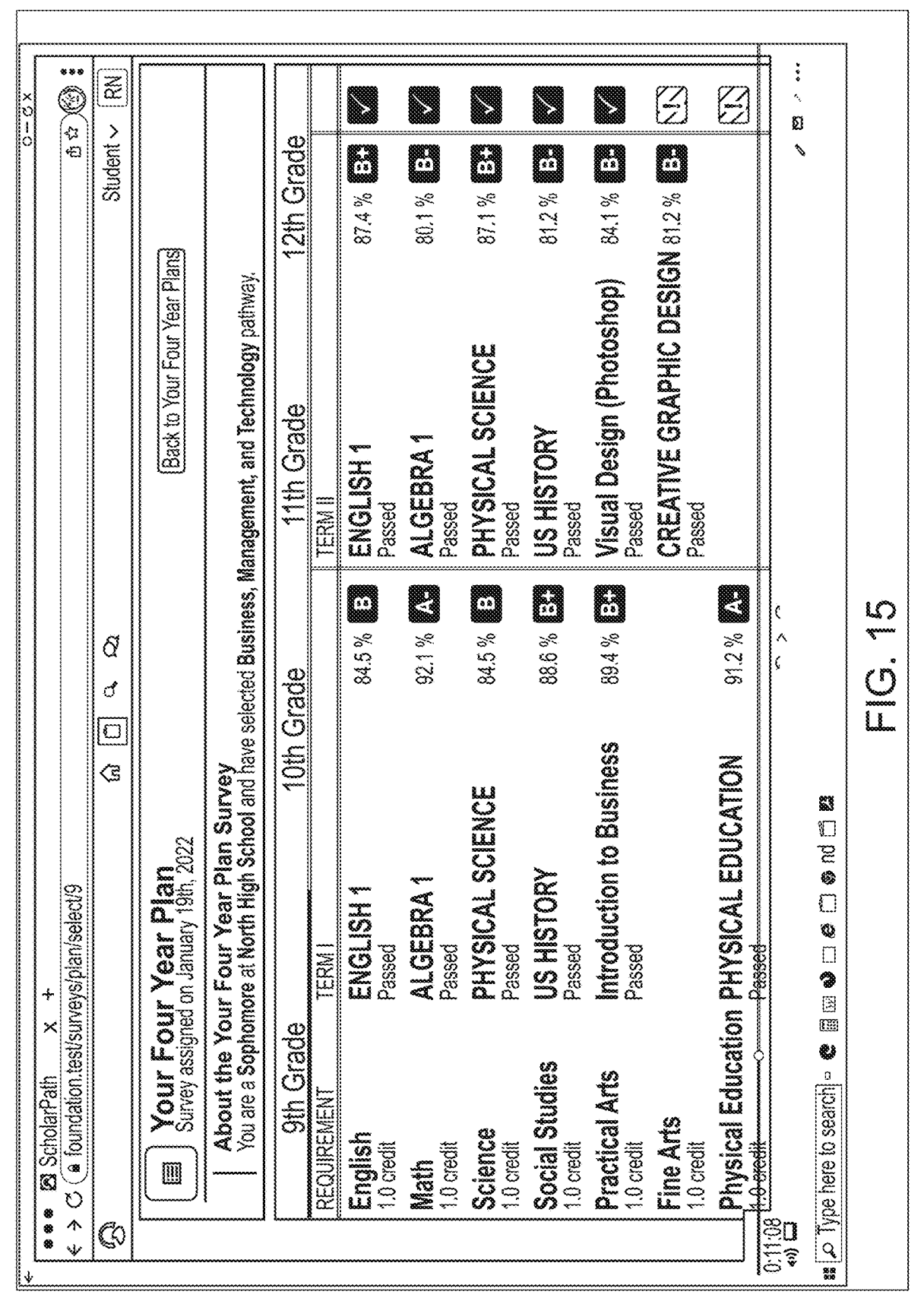
Figure 16:
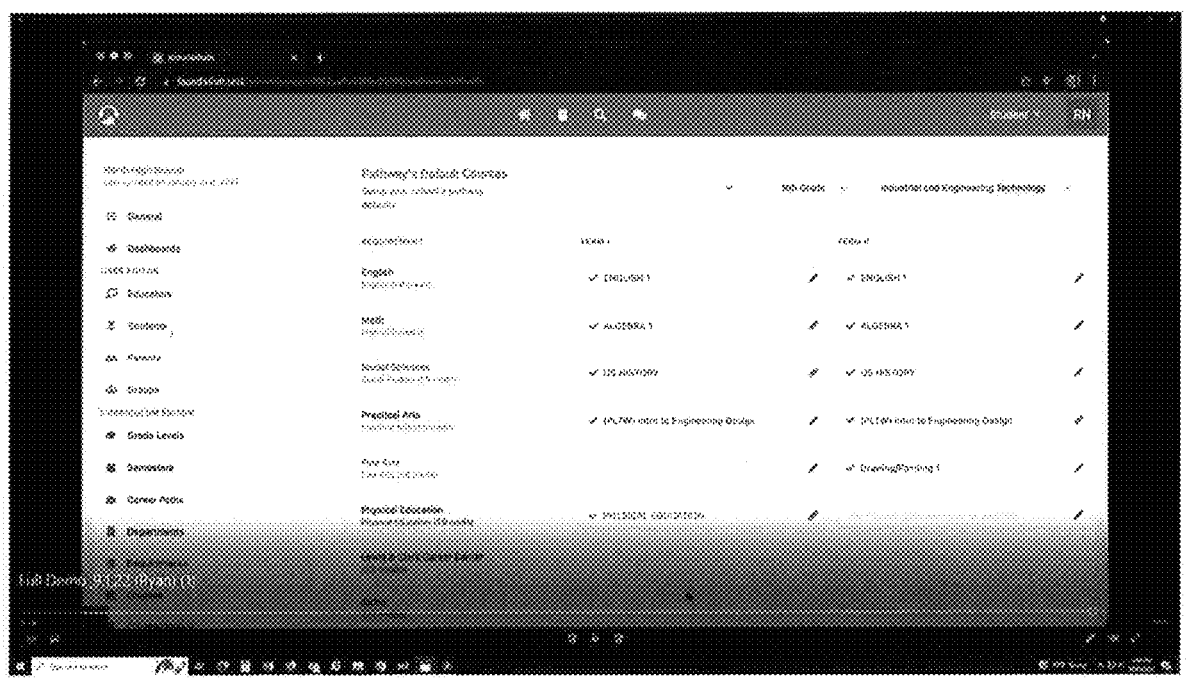
FIG. 16 provides an embodiment of a screen shot showing suggested courses in a proposed pathway.

An embodiment of interaction of a candidate with their current educational institution (which could alternatively be an employer in another embodiment of the system) is shown in FIG. 14, FIG. 15, and FIG. 16. Here, the candidate has been identified via various of the profiling tools on the system as having aptitude for a career in business management and technology. In this embodiment, the candidate has also determined that they are in agreement with this assessment and they are interested in pursuing such a path further (at least at this time). The educational institution they are at, offers a variety of pathways of classes related to different types of opportunities. What this will typically mean is that a candidate that selects classes in a pathway will typically be both better prepared to pursue opportunities in that pathway, and will be of greater interest to providers with opportunities at the end of that pathway. From, the screen of FIG. 14, the user may select the business management and technology pathway. This selection can then result in the system providing them an indication of elective classes they should take that are offered by their current institution to best pursue this pathway while they are at this educational institution. The system can even help them to schedule out their educational pathway during their remaining years at the institution to simplify their future class selection.

Tools related to control of the candidates' course selection are shown in further detail in FIG. 16. In this case, the pathway has been selected, and now the student is provided with a proposed schedule based on that pathway. The pathway proposes specific elective courses (as well as any required courses for graduation etc.) which provide a best fit for this candidate to pursue this pathway. This may be based both on classes available to this candidate (based on their current academic year, for example) and can incorporate coursework already completed (e.g. to provide prerequisites for certain classes or to meet the educational institution's distribution requirements, for example). The course display is typically multi-year so that the candidate can be aware of the classes they should likely take each year and what their schedule will look like each year. Gaps can be left for optional/elective coursework where additional pathway classes are not required. Alternatively, structured gaps can also be provided to assist with obtaining distribution requirements or other requirements which may have flexibility within bounds. For example, the schedule may indicate that a "social science" class should be taken in a certain year without indication of any specific class selected.

At the same time, the courses are not fixed, and a candidate may, for example, chose to alter or edit a course depending on their personal preferences over and above the chosen pathway. Such alternation may be reflected by the system of a movement from the "ideal" pathway for the chosen career path, may result in reorganizing the classes (which may be to deal with a schedule conflict, for example), or may be freely done without indication of any change from the pathway, depending on embodiment.

Figure 17:
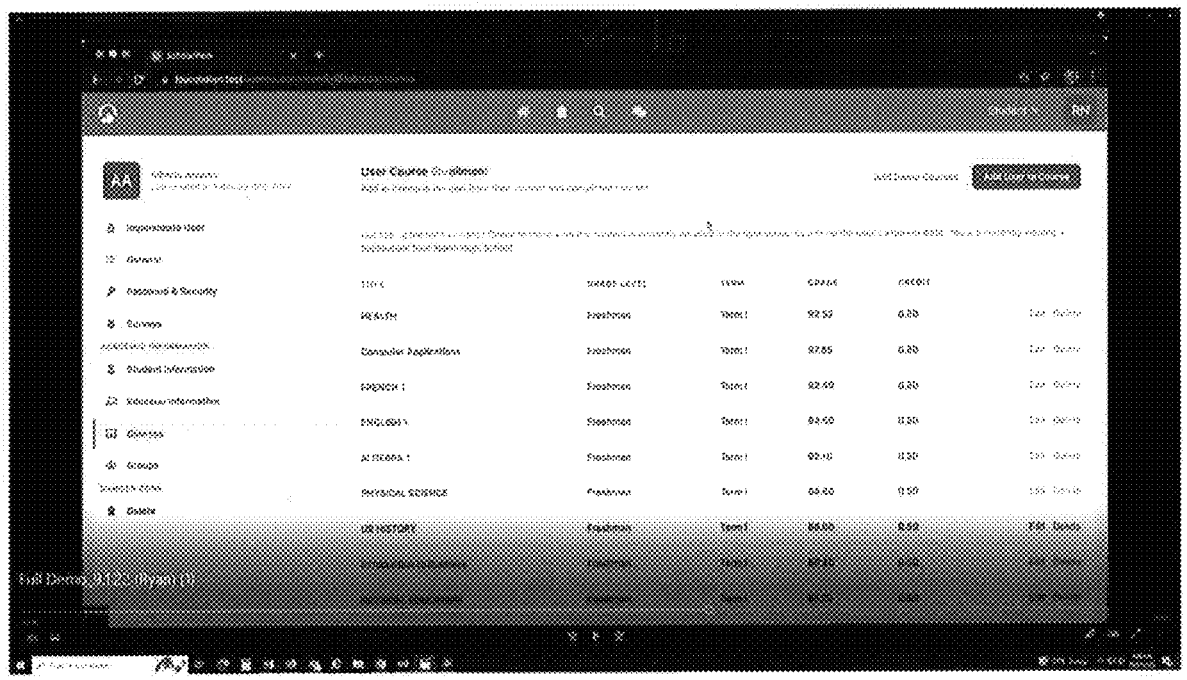
FIG. 17 provides an embodiment of a screen shot provided to an educational institution that illustrates potential enrollment in classes based on candidate pathway selections.

One advantage of students using the pathway is that it provides a fairly good indication of the candidates' course interest at the entire educational institution for the next few years. This can be used by their educational institution in a screen such as that of FIG. 17. In FIG. 17, the educational institution, via their dashboard, has been provided an indication of the classes that its candidate students have indicated interest in taking in any given semester based on their selected pathways. This information can be used by the educational institution to better hire and direct faculty towards areas of increased interest over time, and to assist in scheduling of classes to make classes of interest available to more students interested in taking them. This allows the educational institution to provide better service to students, and helps students to better achieve their goals.

A student with a pathway selected can also get feedback on if they are meeting the targeted goals of the pathway. In FIG. 15, a candidate is provided with an indication of classes they have taken, their grade in that class, and if that is considered generally "on-track" for the pathway they have selected based on interest from providers looking for those pursuing that pathway and their acceptance criteria. From this display, a student can get a ready indicator of how well they are doing at pursuing the pathway to their current goals. Thus, a candidate who may have selected a pathway of interest, but who is struggling to meet necessary criteria on that pathway (e.g. grades are not meeting typical minimums needed for that pathway) may be encouraged to potentially reevaluate their pathway or select a different one, to better focus on the pathway as a way to meet their goals, or even to alter their educational institution or educational plan to better meet their goals. Similarly, a candidate that is close to the targets of their pathway (e.g. that is not easily exceeding them) may be encouraged to focus their efforts in certain problematic areas or classes (e.g. to obtain a math tutor or seek out specific additional math classes in a certain area even if they are passing their current classes) to pull certain of their grades up and improve their pathway performance to meet more of the desired criteria.

The systems and methods described herein provide a comprehensive solution to the challenges that students, counselors, parents, educational institutions (including colleges, vocational schools, high schools and professional schools), the military, the government, and employers have been grappling with for decades. This platform helps candidates imagine and achieve real career outcomes, generally while still in school, while also providing a talent acquisition platform and pipeline for providers that assists students of high aptitude for their career to connect with them. This unique ecosystem attracts candidates by providing a research platform that guides them to relevant organizations and institutions, assists with learning about and planning for a career, obtaining and providing a wealth of information which is useful in understanding their interests, and promoting those interests in a way which is productive, without them risking their provided information being used in a manner they did not want or intend. It does this while also providing providers a way to reach motivated, well-qualified candidates that are good fits for the opportunities they provide, without the providers risking their own inherent biases on desired candidates causing them to miss valuable candidates. The system will change how candidates plan their future and how talent is recruited.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus, or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A system providing a blinded messaging service comprising:
   a server computer communicably coupled to a telecommunications network;
   a provider computer of at least one provider, said provider computer communicably coupled to said server computer via said telecommunications network; and
   a plurality of candidate computers, each candidate computer being a computer of a candidate and communicably coupled to said server computer via said telecommunications network;
   wherein said computer server receives from each candidate, candidate profile data;
   wherein said computer server receives from said provider computer, a communication comprising candidate selection criteria, said candidate selection criteria comprising information about characteristics desired by said at least one provider for a candidate for an opportunity offered by said provider;
   wherein said computer server receives from said provider computer, a communication comprising information about said opportunity, said communication being linked to said candidate selection criteria;
   wherein said computer server compares said received candidate selection criteria to said candidate profile data for each candidate and creates a set of candidates whose candidate profiles match said received candidate selection criteria; and only for each candidate in said set of candidates, said computer server placing said communication as part of a news feed provided to each candidate in said set of candidates without revealing to any candidate in said set of candidates that said communication is provided in said news feed because said candidate profile data matches said candidate selection criteria.

2. The system of claim 1, wherein said candidate profile data for each candidate in said plurality of candidates comprises educational data about said each candidate.

3. The system of claim 2, wherein said educational data comprises one or more of grades, classes taken, grade point average, attendance history, standardized test scores, and certifications received.

4. The system of claim 1, wherein said opportunity is selected from the group consisting of: a job, admission to an academic institution, and enlistment in military service.

5. The system of claim 1, further comprising:

said provider computer receives a message comprising a number of candidates in said set of candidates.

6. The system of claim 5, further comprising:

said computer server determines whether said number of candidates is at or above a predefined threshold;

only if said computer server determines that said number of candidates is at or above said predefined threshold, said computer server transmitting to said provider computer a message comprising said number of candidates; and if said computer server determines that said number of candidates is not at or above said predefined threshold, said computer server does not transmit to said provider computer said message comprising said number of candidates.

7. The system of claim 1, further comprising:

in response to receiving said copy of said communication comprising information about said opportunity, at least one candidate manipulating a user interface of said candidate computer of said at least one candidate to opt into further communication from said provider.

8. The system of claim 7, wherein said provider is notified that a candidate whose candidate profile matched said received candidate selection criteria opted into receiving further communication, but said candidate whose candidate profile matched said received candidate selection criteria is not identified to said provider.

9. The system of claim 8, wherein said provider may communicate directly with said candidate whose candidate profile matched said received candidate selection criteria.

10. The system of claim 8, wherein said provider may provide communications for posting to said news feed of said candidate whose candidate profile matched said received candidate selection criteria.

11. The system of claim 1, wherein said candidate profile data includes results from a candidate having completed one or more surveys.

* * * * *